United States Patent
Miyake et al.

(10) Patent No.: US 12,087,938 B2
(45) Date of Patent: Sep. 10, 2024

(54) NEGATIVE ELECTRODE FOR POWER STORAGE DEVICE, POWER STORAGE DEVICE, AND ELECTRIC DEVICE

(71) Applicant: Semiconductor Energy Laboratory Co., LTD., Atsugi (JP)

(72) Inventors: Hiroyuki Miyake, Kanagawa (JP); Nobuhiro Inoue, Kanagawa (JP); Ryo Yamauchi, Kanagawa (JP); Mako Motoyoshi, Kanagawa (JP); Takahiro Kawakami, Kanagawa (JP); Mayumi Mikami, Kanagawa (JP); Miku Fujita, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 540 days.

(21) Appl. No.: 15/374,048

(22) Filed: Dec. 9, 2016

(65) Prior Publication Data

US 2017/0170466 A1    Jun. 15, 2017

(30) Foreign Application Priority Data

Dec. 11, 2015 (JP) .................................. 2015-242739
May 12, 2016 (JP) .................................. 2016-095789

(51) Int. Cl.
*H01M 4/36* (2006.01)
*H01G 11/06* (2013.01)
(Continued)

(52) U.S. Cl.
CPC ............ *H01M 4/366* (2013.01); *H01G 11/06* (2013.01); *H01G 11/28* (2013.01); *H01G 11/30* (2013.01);
(Continued)

(58) Field of Classification Search
None
See application file for complete search history.

(56) References Cited

U.S. PATENT DOCUMENTS 6,835,496 B1   12/2004   Kaminaka et al.
6,881,518 B2   4/2005    Kaminaka et al.
(Continued)

FOREIGN PATENT DOCUMENTS

EP      1028476 A    8/2000
EP      1638158 A    3/2006
(Continued)

OTHER PUBLICATIONS

O.N. Senkov et al., Metallic Materials with High Structural Efficiency, Kluwer Academic Publishers, 2004, pp. 287-308. (Year: 2004).*

*Primary Examiner* — Thanh Truc Trinh
(74) *Attorney, Agent, or Firm* — NIXON PEABODY LLP; Jeffrey L. Costellia

(57) ABSTRACT

A power storage device having high capacitance is provided. A power storage device with excellent cycle characteristics is provided. A power storage device with high charge and discharge efficiency is provided. A power storage device including a negative electrode with low resistance is provided. A negative electrode for a power storage device includes a number of composites in particulate forms. The composites include a negative electrode active material, a first functional material, and a compound. The compound includes a constituent element of the negative electrode active material and a constituent element of the first functional material. The negative electrode active material includes a region in contact with at least one of the first functional material or the compound.

14 Claims, 30 Drawing Sheets

(51) Int. Cl.

| | | |
|---|---|---|
| *H01G 11/28* | (2013.01) | |
| *H01G 11/30* | (2013.01) | |
| *H01G 11/36* | (2013.01) | |
| *H01G 11/50* | (2013.01) | |
| *H01M 4/134* | (2010.01) | |
| *H01M 4/38* | (2006.01) | |
| *H01M 4/62* | (2006.01) | |
| *H01M 10/0525* | (2010.01) | |

(52) U.S. Cl.
CPC ............ *H01G 11/36* (2013.01); *H01G 11/50* (2013.01); *H01M 4/134* (2013.01); *H01M 4/386* (2013.01); *H01M 4/626* (2013.01); *H01M 10/0525* (2013.01)

(56) References Cited

U.S. PATENT DOCUMENTS

| | | | |
|---|---|---|---|
| 7,597,997 B2 | 10/2009 | Sato et al. | |
| 8,080,335 B2 | 12/2011 | Kawakami et al. | |
| 2003/0062193 A1* | 4/2003 | Thaysen | B81B 3/0021 174/255 |
| 2006/0147800 A1* | 7/2006 | Sato | H01M 4/134 429/231.95 |
| 2008/0096110 A1 | 4/2008 | Bito et al. | |
| 2011/0084229 A1 | 4/2011 | Kawakami et al. | |
| 2011/0163274 A1* | 7/2011 | Plee | H01M 4/622 427/78 |
| 2011/0291240 A1 | 12/2011 | Yamazaki | |
| 2012/0003535 A1 | 1/2012 | Yamazaki | |
| 2014/0087251 A1 | 3/2014 | Takahashi et al. | |
| 2015/0044560 A1 | 2/2015 | Ogino | |
| 2015/0132649 A1 | 5/2015 | Ogino et al. | |
| 2015/0167176 A1* | 6/2015 | Hampsch | C23C 14/0015 428/629 |
| 2015/0243972 A1* | 8/2015 | Ito | B60L 3/04 427/126.6 |
| 2015/0340691 A1 | 11/2015 | Inoue et al. | |
| 2016/0020035 A1 | 1/2016 | Inoue et al. | |
| 2016/0190576 A1 | 6/2016 | Miyake et al. | |

FOREIGN PATENT DOCUMENTS

| | | |
|---|---|---|
| EP | 1873846 A | 1/2008 |
| JP | 2000-149937 A | 5/2000 |
| JP | 2005-011802 A | 1/2005 |
| JP | 2006-100244 A | 4/2006 |
| JP | 2006-253126 A | 9/2006 |
| JP | 2007-018828 A | 1/2007 |
| JP | 2007-335283 A | 12/2007 |
| JP | 2008-016446 A | 1/2008 |
| JP | 2012-009429 A | 1/2012 |
| JP | 2015-095301 A | 5/2015 |

\* cited by examiner

110

110A

111

111A

FIG. 15A1
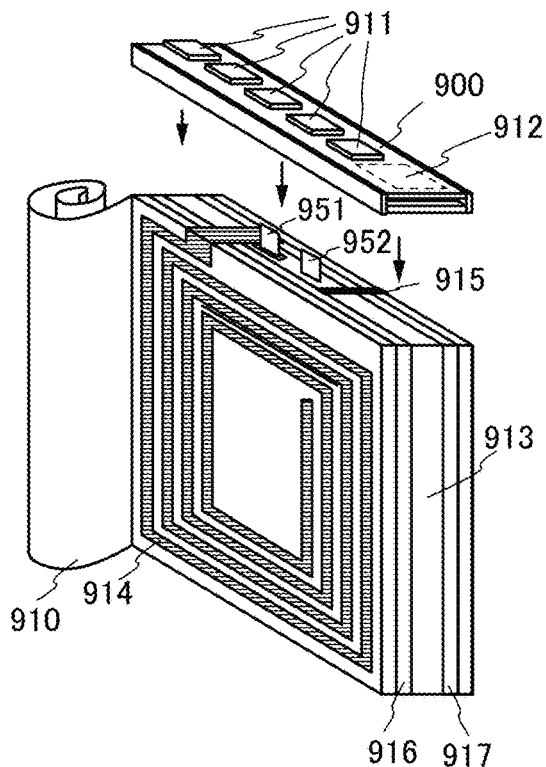
FIG. 15A2
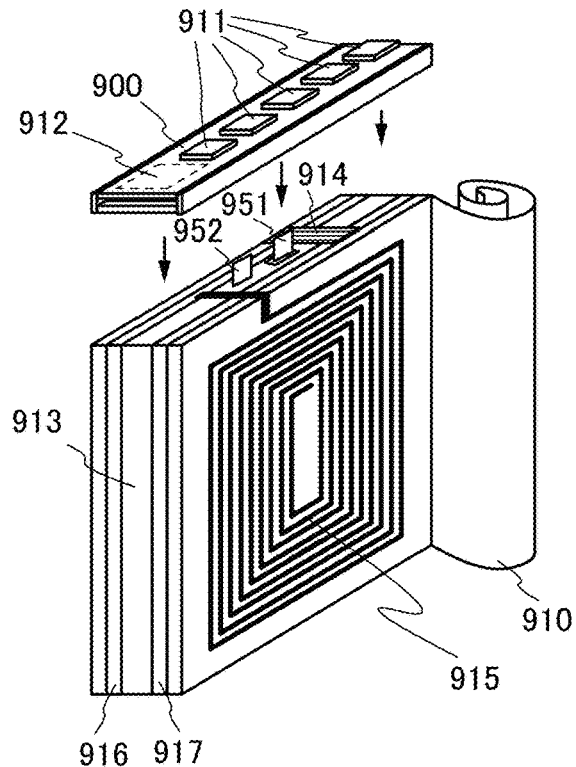
FIG. 15B1
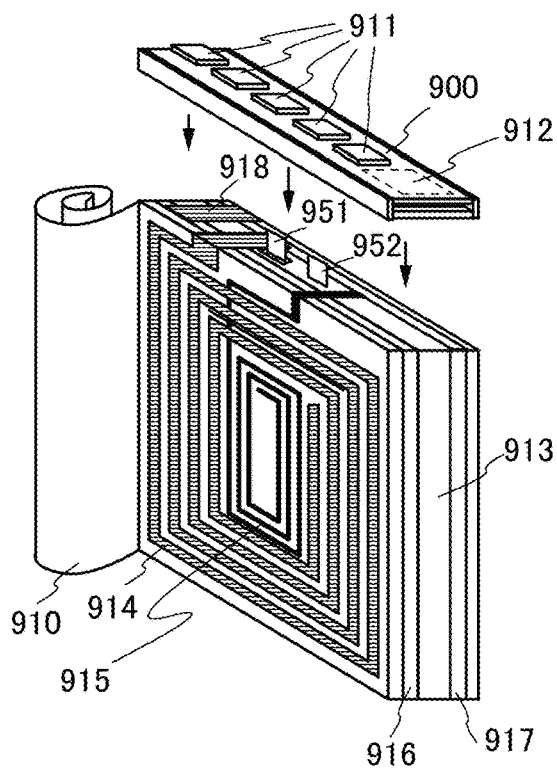
FIG. 15B2
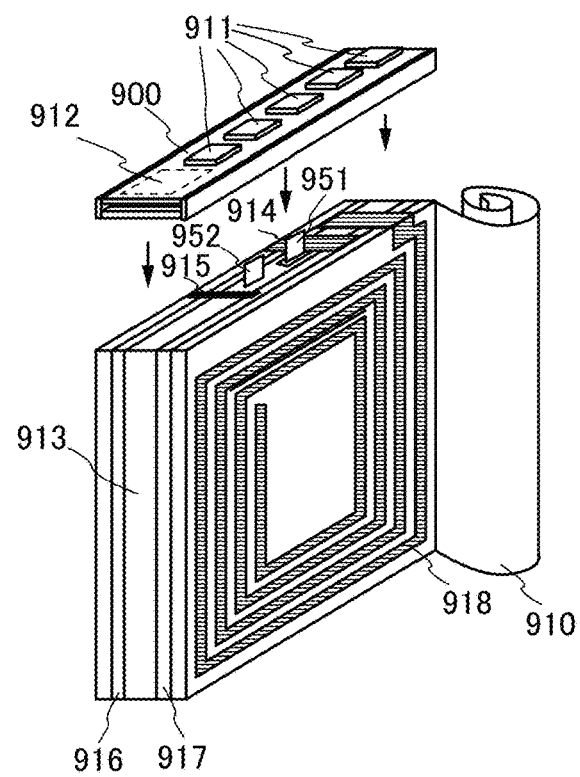

NEGATIVE ELECTRODE FOR POWER STORAGE DEVICE, POWER STORAGE DEVICE, AND ELECTRIC DEVICE

BACKGROUND OF THE INVENTION

1. Field of the Invention

The present invention relates to an object, a method, or a manufacturing method. The present invention relates to a process, a machine, manufacture, or a composition of matter. One embodiment of the present invention particularly relates to a semiconductor device, a display device, a light-emitting device, a power storage device, a driving method thereof, and a manufacturing method thereof. In particular, one embodiment of the present invention relates to an electrode for a power storage device and a manufacturing method thereof.

2. Description of the Related Art

In recent years, portable electronic devices such as mobile phones, smartphones, electronic book (e-book) readers, and portable game machines have been widely used. Being used as power sources for driving these devices, power storage devices typified by lithium-ion secondary batteries have been researched and developed actively. Power storage devices are of growing importance in a variety of uses; for example, hybrid vehicles and electric vehicles receive attention because of an increased interest in global environmental problems and an oil resources problem.

A lithium-ion secondary battery, which is a power storage device and widely used because of its high energy density, includes a positive electrode including an active material such as lithium cobalt oxide ($LiCoO_2$) or lithium iron phosphate ($LiFePO_4$), a negative electrode formed of a carbon material such as graphite capable of receiving and releasing lithium ions, and an electrolytic solution in which an electrolyte formed of a lithium salt such as $LiBF_4$ or $LiPF_6$ is dissolved in an organic solvent such as ethylene carbonate (EC) or diethyl carbonate (DEC), for example. The lithium-ion secondary battery is charged and discharged in such a manner that lithium ions in the lithium-ion secondary battery move between the positive electrode and the negative electrode through the electrolytic solution and intercalated into or deintercalated from the positive electrode active material and the negative electrode active material.

Lithium-ion secondary batteries are widely used as power sources for driving portable electronic devices, electric vehicles, and the like, and there is a very great need for more compact and higher capacity lithium-ion secondary batteries.

Thus, electrodes formed of an alloy-based material of silicon, tin, or the like, instead of a carbon material such as graphite (black lead) which has been conventionally used as a negative electrode active material, have been actively developed. A negative electrode used in a lithium-ion secondary battery is fabricated by forming an active material on at least one surface of a current collector. Graphite that can occlude and release ions serving as carriers (hereinafter referred to as carrier ions) has been conventionally used as a negative electrode active material. The negative electrode has been fabricated in such a manner that graphite as a negative electrode active material, carbon black as a conductive additive, and a resin as a binder are mixed to form slurry, and the slurry is applied to a current collector and dried.

Compared with carbon, silicon, which is a material alloyed and dealloyed with lithium, can increase capacity when used as a negative electrode active material. A silicon negative electrode has a dramatically high theoretical capacity of 4200 mAh/g as compared to a carbon (graphite) negative electrode with a theoretical capacity of 372 mAh/g. Thus, in terms of increasing the capacity of lithium-ion secondary battery, silicon is the most suitable material.

However, when the material that is alloyed and dealloyed with lithium (e.g., silicon) greatly expands and contracts with occlusion and release of carrier ions in charge and discharge cycles; therefore, when the amount of carrier ions occluded by the material increases, the contact states between an active material and a conductive additive, between active materials, and between an active material and a current collector become worse and a conductive path is lost in some cases. The loss of the conductive path decreases the capacity with charge and discharge cycles. Moreover, in some cases, silicon is deformed or broken to be separated from a current collector or pulverized, so that a function as a lithium-ion secondary battery becomes difficult to maintain.

In Patent Document 1, a silicon layer is formed over a current collector, and a conductive layer is formed over the silicon layer. This allows electrical connection between the silicon layer and the current collector to be maintained through the conductive layer even when the silicon layer is separated from the current collector because of repeated expansion and contraction of the silicon; thus, degradation of battery properties can be inhibited. Patent Document 1 also discloses that a silicon layer to which an impurity such as phosphorus or boron is added is used as the conductive layer.

REFERENCE

Patent Document

[Patent Document 1] Japanese Published Patent Application No. 2012-009429

SUMMARY OF THE INVENTION

An object of one embodiment of the present invention is to provide a power storage device having high capacitance. Another object of one embodiment of the present invention is to provide a power storage device with excellent cycle characteristics. Another object of one embodiment of the present invention is to provide a power storage device with high charge and discharge efficiency. Another object of one embodiment of the present invention is to provide a novel power storage device or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a negative electrode for a power storage device comprising a multitude of composites in particulate forms. The composites include a negative electrode active material and a first functional material. The negative electrode active material includes a region in contact with the first functional material.

Another embodiment of the present invention is a negative electrode for a power storage device comprising a multitude of composites in particulate forms. The composites include a negative electrode active material, a first functional material, and a compound. The compound includes a constituent element of the negative electrode active material and a constituent element of the functional material. The negative electrode active material includes a region in contact with at least one of the functional material and the compound.

Another embodiment of the present invention is a negative electrode for a power storage device comprising a multitude of composites in particulate forms. The above-described composites include negative electrode active materials and the composite including the first functional material. The composite includes the above-described negative electrode active material, the first functional material, and the compound.

Another embodiment of the present invention is the above-described negative electrode for a power storage device, in which the first functional material has a higher Young's modulus than that of the negative electrode active material.

Another embodiment of the present invention is the above-described negative electrode for a power storage device, in which the negative electrode active material includes silicon.

Another embodiment of the present invention is the above-described negative electrode for a power storage device, in which the first functional material includes titanium.

Another embodiment of the present invention is the above-described negative electrode for a power storage device, in which an atomic ratio of silicon to titanium is twice to eight times as large as that of titanium.

Another embodiment of the present invention is the above-described negative electrode for a power storage device, in which a particle diameter of the composite is greater than or equal to 0.1 μm and less than or equal to 20 μm.

Another embodiment of the present invention is the above-described negative electrode for a power storage device, in which a surface of the composite is covered with a second functional material.

Another embodiment of the present invention is the above-described negative electrode for a power storage device including a second functional material, in which a film thickness of the second functional material is greater than or equal to 10 nm and less than or equal to 200 nm.

Another embodiment of the present invention is the above-described negative electrode for a power storage device, in which the second functional material includes a constituent element common to the above-described first functional material.

Another embodiment of the present invention is a power storage device including the above-described negative electrode for a power storage device.

Another embodiment of the present invention is an electrical device including the above-described power storage device.

One embodiment of the present invention can provide a power storage device having high capacitance. One embodiment of the present invention can provide a power storage device with excellent cycle characteristics. One embodiment of the present invention is to provide a power storage device with high charge and discharge efficiency. One embodiment of the present invention can provide a power storage device including a negative electrode with low resistance. One embodiment of the present invention can provide a novel power storage device or the like.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 15A1, 15A2, 15B1, and 15B2 illustrate examples of power storage devices;

DETAILED DESCRIPTION OF THE INVENTION

Hereinafter, embodiments will be described with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Embodiment 1

In this embodiment, a negative electrode used in a power storage device of one embodiment of the present invention will be described. In addition, a method for fabricating a negative electrode will be described.

[Negative Electrode Structure 1]

Figure 1A:
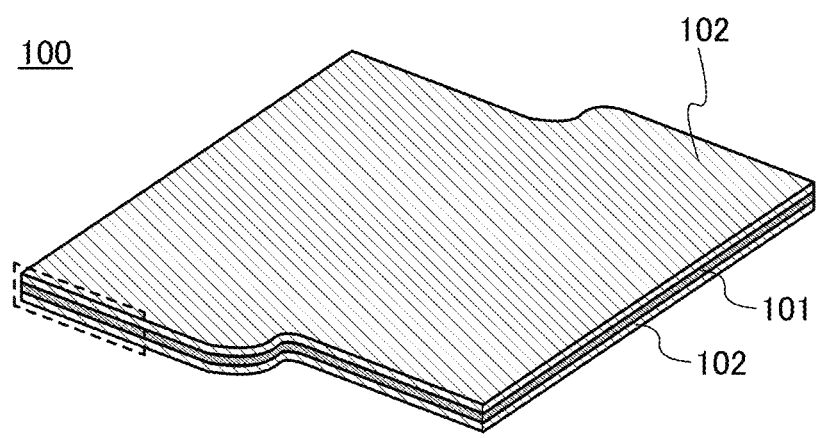
FIGS. 1A and 1B illustrate a negative electrode.
Figure 1B:
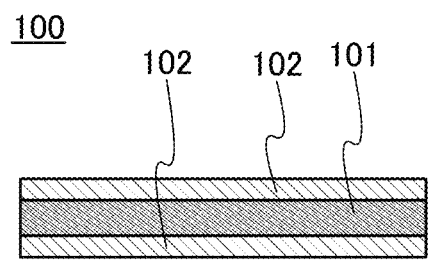

FIG. 1A is an overhead view of a negative electrode, and FIG. 1B is an enlarged cross-sectional view of a portion surrounded by a broken line in FIG. 1A. A negative electrode 100 has a structure in which negative electrode active material layers 102 are provided in contact with a negative electrode current collector 101. Although the negative electrode active material layers 102 are provided so that the negative electrode current collector 101 is sandwiched therebetween in FIGS. 1A and 1B, the negative electrode active material layer 102 may be formed over only one surface of the negative electrode current collector 101.

The negative electrode active material layer 102 includes many particles of a composite. Thus, the negative electrode for a power storage device of one embodiment of the present invention includes a composite. The composite includes a negative electrode active material and a functional material. A specific structure of the composite will be described later.

Note that an active material refers to a material that relates to intercalation and deintercalation of ions serving as carriers. When the negative electrode is formed, which is described later, a composite including the active material is mixed with other materials such as a conductive additive, a binder, and a solvent and is formed as an active material layer over the current collector. Thus, the active material and the active material layer are distinguished from each other.

The negative electrode current collector 101 can be formed using a material that has a high conductivity and is not alloyed with carrier ions such as lithium ions, e.g., a metal such as gold, platinum, zinc, iron, copper, titanium, tantalum, or manganese, or an alloy thereof (e.g., stainless steel). Still alternatively, a metal element which forms silicide by reacting with silicon can be used. Examples of the metal element which forms silicide by reacting with silicon are zirconium, titanium, hafnium, vanadium, niobium, tantalum, chromium, molybdenum, tungsten, cobalt, nickel, and the like. The negative electrode current collector 101 can have a foil-like shape, a plate-like shape (sheet-like shape), a net-like shape, a cylindrical shape, a coil shape, a punching-metal shape, an expanded-metal shape, or the like as appropriate. The negative electrode current collector 101 preferably has a thickness greater than or equal to 5 μm and less than or equal to 30 μm, more preferably greater than or equal to 8 μm and less than or equal to 15 μm. Note that, for example, the thickness of the negative electrode current collector 101 is preferably greater than or equal to 5 μm and less than or equal to 30 μm, more preferably greater than or equal to 8 μm and less than or equal to 15 μm over the whole region. Note that one aspect of the embodiment of the present invention is not limited thereto. For example, at least part of the negative electrode current collector 101 may have a thickness greater than or equal to 5 μm and less than or equal to 30 μm, preferably greater than or equal to 8 μm and less than or equal to 15 μm. Furthermore, 50% or more of the negative electrode current collector 101 preferably has a thickness greater than or equal to 5 μm and less than or equal to 30 μm, more preferably, greater than or equal to 8 μm and less than or equal to 15 μm.

For the negative electrode active material, a metal and a compound of the metal which are alloyed and dealloyed with carrier ions to enable a charge and discharge reaction to occur can be used. In the case where carrier ions are lithium ions, examples of the metal include Mg, Ca, Al, Si, Ge, Sn, Pb, As, Sb, Bi, Ag, Au, Zn, Cd, and Hg. Such a metal has higher capacity than graphite. In particular, silicon (Si) has a significantly high theoretical capacity of 4200 mAh/g. For this reason, silicon is preferably used as the negative electrode active material. Examples of compound materials using such elements include $SiO$, $Mg_2Si$, $Mg_2Ge$, $SnO$, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

Alternatively, for the negative electrode active material, an oxide such as titanium dioxide ($TiO_2$), lithium titanium oxide ($Li_4Ti_5O_{12}$), niobium pentoxide ($Nb_2O_5$), tungsten oxide ($WO_2$), or molybdenum oxide ($MoO_2$) can be used. Further alternatively, as the negative electrode active material, lithium-graphite intercalation compound ($Li_xC_6$) may be used.

Further alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

The negative electrode for a power storage device of one embodiment of the present invention uses silicon for the negative electrode active material. As silicon, amorphous silicon, microcrystalline silicon, polycrystalline silicon, or a combination thereof can be used. In general, silicon with higher crystallinity has higher electric conductivity; therefore, silicon with high crystallinity can be used for an electrode having high conductivity in a power storage device. On the other hand, amorphous silicon can occlude a larger amount of carrier ions such as lithium ions than crystalline silicon, which results in an increase in discharge capacity.

Furthermore, increasing the conductivity of silicon by adding an impurity can reduce the unevenness of a battery reaction in the electrode. Examples of an impurity to be added include impurities that impart n-type conductivity, such as phosphorus (P) and arsenic (As) and impurities that impart p-type conductivity, such as boron (B), aluminum (Al), and gallium (Ga). For example, the resistivity of silicon is preferably higher than or equal to $10^{-4}$ Ω·cm and lower than or equal to 50 Ω·cm, more preferably higher than or equal to $10^{-3}$ Ω·cm and lower than or equal to 20 Ω·cm.

The composite includes the functional material. The functional material is formed in contact with the negative electrode active material. The functional material preferably has a strong adhesion with the negative electrode active material. For example, at an interface between the functional material and the negative electrode active material, chemical bonds such as metal bonds or covalent bonds may be formed between the consistent atoms of the functional material and the negative electrode active material. Further, in the vicinity of the interface of the functional material and the negative electrode active material, a compound such as an alloy of the functional material and the negative electrode active material, or the like may be formed.

By the functional material being formed in contact with the negative electrode active material, the deformation, pulverization, and the like of the negative electrode active material due to expansion and contraction can be prevented. Thus, the functional material preferably has a high Young's modulus. Specifically, the functional material preferably has a higher Young's modulus than the negative electrode active material. Furthermore, even when the negative electrode active material is covered with the functional material, it is preferable that the functional material do not form an alloy with the carrier ion, and the transmitting property of the carrier ions be high in order to allow occlusion and release of career ions. Furthermore, the conductivity of the functional material is preferably be high.

Note that there is a case where charge and discharge states of a power storage device cause a change in the Young's modulus of the negative electrode active material. For example, in the case where silicon is used as the negative electrode active material in the discharge state in which the active material hardly contains lithium, has a higher Young's modulus than that in the charge state in which the active material contains lithium. The functional material preferably has a higher Young's modulus than the active material in the discharge state.

As the functional material, a material containing titanium is preferably used. Specifically, titanium, titanium silicide such as $Ti_3Si$, $Ti_5Si_3$, TiSi, or $TiSi_2$, an oxide containing titanium ($TiO_x$), a nitride containing titanium ($TiN_x$), an oxynitride containing titanium ($TiO_xN_y$), lithium titanate ($L_4Ti_5O_{12}$, also referred to as LTO), or the like can be used. Since titanium has a high Young's modulus and a high lithium ion-transmitting property, a material containing titanium can preferably be used as a functional material. Furthermore, tungsten, aluminum oxide, or the like may be used as the functional material.

The negative electrode for a power storage device of one embodiment of the present invention uses titanium, $TiN_x$, or $TiO_x$ as the functional material.

The negative electrode active material layer 102 preferably includes a conductive additive. The conductive additive included in the negative electrode active material layer 102 increases the electronic conductivity of the negative electrode active material layer 102. As the conductive additive, any of a variety of conductive additives such as acetylene black particles, ketjen black (registered trademark) particles, carbon particles of carbon nanofibers, and graphene can be used.

The negative electrode active material layer 102 may further include a binder. The binder can increase the adhesion between the negative electrode active material and the conductive additive or the like, and the adhesion between the negative electrode active material and the current collector.

As the binder, polyvinylidene fluoride (PVDF) as a typical one, polyimide, polytetrafluoroethylene, polyvinyl chloride, an ethylene-propylene-diene polymer, butadiene rubber, styrene-butadiene rubber, butyl rubber, acrylonitrile-butadiene rubber, fluorine rubber, polyvinyl acetate, polymethyl methacrylate, polyethylene, polypropylene, nitrocellulose, or the like can be used. In particular, when silicon or the like whose volume changes markedly by charge and discharge is used as the negative electrode active material, the use of polyimide with an excellent binding property enhances adhesion between the negative electrode active materials, the negative electrode active material and the conductive additive, the negative electrode active material and the current collector, and graphene and the current collector. Thus, separation and pulverization of the negative electrode active material are suppressed, which makes it possible to obtain excellent charge-discharge cycle performance.

Next, with reference to FIGS. 2A and 2B, FIGS. 3A and 3B, and FIG. 4, cross-sectional structural examples of a composite in particulate forms applicable to the negative electrode active material layer 102 will be described. FIGS. 2A and 2B, FIGS. 3A and 3B, and FIG. 4 are cross-sectional views that correspond to a cross section that passes near a center point of a sphere shape in the case where the composite is approximated to the sphere shape with a certain radius.

<Cross-Sectional Structure Example of Composite Particle 1>

Figure 2A:
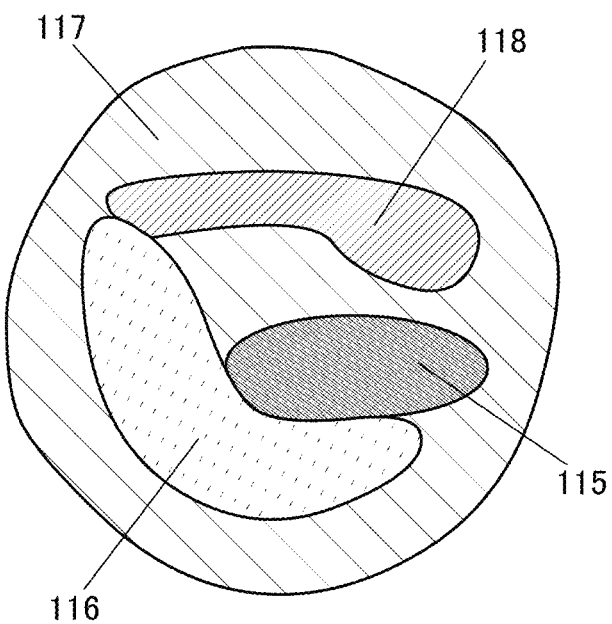
FIGS. 2A and 2B each illustrate a composite particle included in a negative electrode active material layer.

A composite 110 illustrated in FIG. 2A includes a negative electrode active material 115, a functional material 116, and compounds 117 and 118. The compounds 117 and 118 are compounds of the negative electrode active material 115 and the functional material 116. Thus, the compounds 117 and 118 include a constituent element of the negative electrode active material 115 and a constituent element of the functional material 116.

The functional material 116 has a function of relieving stress caused by expansion or contraction of the composite 110. Furthermore, the element that forms the functional material 116 is included in the compounds 117 and 118 and thus, the compounds 117 and 118 also have the function of relieving the stress. In the structure illustrated in FIG. 2A, the capability levels of relieving the stress are higher in the following order: the functional material 116, the compound 117, and the compound 118.

The compounds 117 and 118 differ in the weight percentage of the element that forms the negative electrode active material 115 and also differ in the weight percentage of the element that forms the functional material 116. Specifically, the compound 118 has a larger weight percentage of the element forming the negative electrode active material 115 than the compound 117.

The negative electrode active material 115 has a region in contact with one or more of the functional material 116 and the compounds 117 and 118. Such a structure can prevent generation of a crack in the surface of the negative electrode active material 115, and thus, a power storage device of one embodiment of the present invention with excellent cycle characteristics can be provided. Furthermore, by covering the surface of the negative electrode active material 115 with one or more of the functional material 116 and the compounds 117 and 118, the generation of a crack in the surface of the negative electrode active material 115 can be further prevented. The functional material 116 has a function of transmitting carrier ions; therefore, the negative electrode active material 115, although being covered by one or more of the functional material 116 and the compounds 117 and 118, can perform occlusion and release of carrier ions. FIG. 2A illustrates an example of the negative electrode active material 115 covered with the functional material 116 and the compound 117.

The negative electrode active material 115, the compounds 117 and 118 and, the functional material 116, the compounds 117 and 118 have constituent atoms in common, and thus, chemical bonds (e.g., metal-bonds) tend to be formed at interfaces thereof. Adhesion of the negative electrode active material 115 and the functional material 116 can be improved by interposing the compound 117 and/or the compound 118 between the negative electrode active material 115 and the functional material 116.

The negative electrode active material 115 has a function of performing occlusion and release of carrier ions. Furthermore, the compounds 117 and 118 have a function of performing occlusion and release of carrier ions because the element that forms the negative electrode active material 115 are included. In the structures illustrated in FIG. 2A, the capability levels of performing occlusion and release of a career ion are higher in the following order: the negative electrode active material 115, the compound 118, and the compound 117.

Note that the larger the weight ratio of the functional material 116 and the compounds 117 and 118 in the composite 110 is, the smaller the capacity of the power storage device that includes the negative electrode active material layer 102 is. Thus, the power storage device in one embodiment of the present invention can have high capacity and cycle characteristics by significantly reducing the weight ratio of the functional material 116, the compounds 117 and 118. The weight ratio may be determined in accordance with required cycle characteristics for the power storage device.

In this embodiment, the negative electrode active material 115 and the functional material 116 are each formed using silicon and titanium. In this case, the compounds 117 and 118 are titanium silicide. Although there is no limitation on the composition of titanium silicide, the composition can be Ti:Si=1:2, 1:3, or 1:4, for example.

Note that in the vicinity of the interface between each region of the negative electrode active material 115, functional material 116, and the compounds 117 and 118, the weight percentage of the element that forms the negative electrode active material 115 and/or the weight percentage of the element that forms the functional material 116 may continuously change in some cases. Thus, it is difficult to determine each of the interfaces of the negative electrode active material 115, the functional material 116, and the compounds 117 and 118 clearly in some cases.

Further, the composite 110 does not necessarily include the compound 117 or the compound 118. Furthermore, the composite 110 may include one or more compounds that are different from the compounds 117 and 118 in terms of the weight percentage of the element forming the negative electrode active material 115 and the weight percentage of the element forming the functional material 116. Furthermore, the negative electrode active material 115 and/or a part of the functional material 116 may be exposed at the surface of the composite 110 without being covered with the compound 117.

Figure 2B:
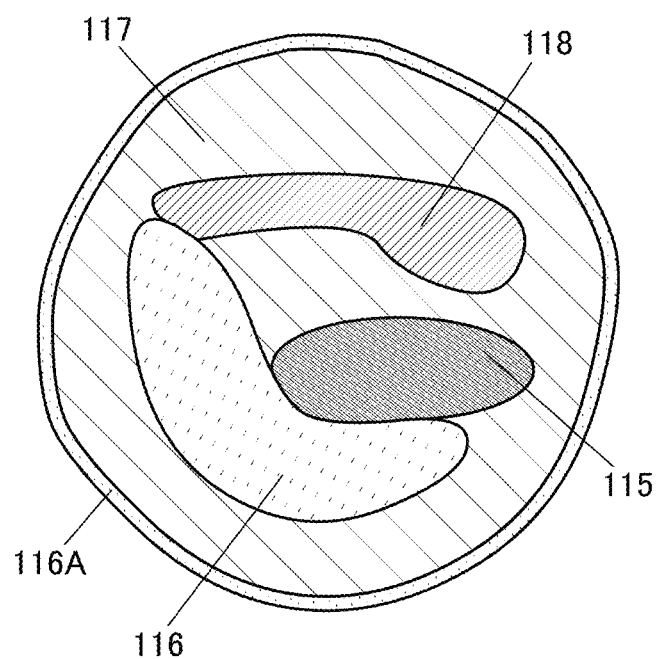

The surface of the composite 110 may be covered with a thin film of a functional material 116A (see FIG. 2B). With such a structure, the stress applied on the surface of a composite 110A is further relieved, and therefore, this structure can further increase the cycle characteristics of the power storage device of one embodiment of the present invention. The functional material 116A may be a material different from the functional material 116; however, the functional material 116A is preferably the same material as the functional material 116. In the case where the composite 110A has a region in which the functional material 116 is in contact with the functional material 116A, by employing the same constituent element to the functional material 116A and the functional material 116, the adhesion between the functional materials 116 and 116A can be increased.

<Cross-Sectional Structure Example of Composite Particle 2>

Figure 3A:
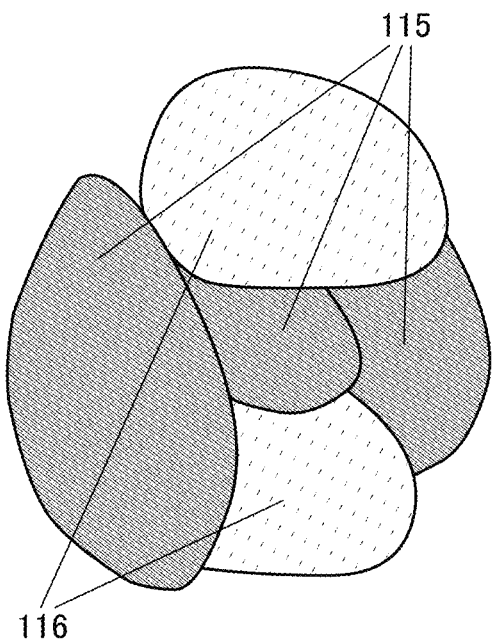
FIGS. 3A and 3B each illustrate a composite particle included in a negative electrode active material layer.

A composite 111 illustrated in FIG. 3A includes the negative electrode active material 115 and the functional material 116. Alternatively, the composite 111 includes one or a plurality of clusters of negative electrode materials 115 and one or a plurality of clusters of functional materials 116. The negative electrode active material 115 includes a region in contact with the functional material 116.

The weight ratio of the negative electrode active material 115 in the composite 111 can be large because the composite 111 does not include the compound 117 and the like. Thus, the power storage device of one embodiment of the present invention can have a higher capacity.

By forming the functional material 116 in contact with the negative electrode active material 115, stress caused by expansion or contraction of the negative electrode active material 115 can be relieved. Note that it is preferable that a chemical bond between the constituent atoms of the negative electrode active material 115 and the functional material 116 be formed at the interface between the negative electrode active material 115 and the functional material 116.

The larger the weight ratio of the functional material 116 in the composite 111 is, the smaller the capacity of the power storage device that includes the negative electrode active material layer 102 is; therefore, the weight ratio of the functional material 116 is preferably as small as possible. The weight ratio can be determined in accordance with cycle characteristics required for the power storage device.

Figure 3B:
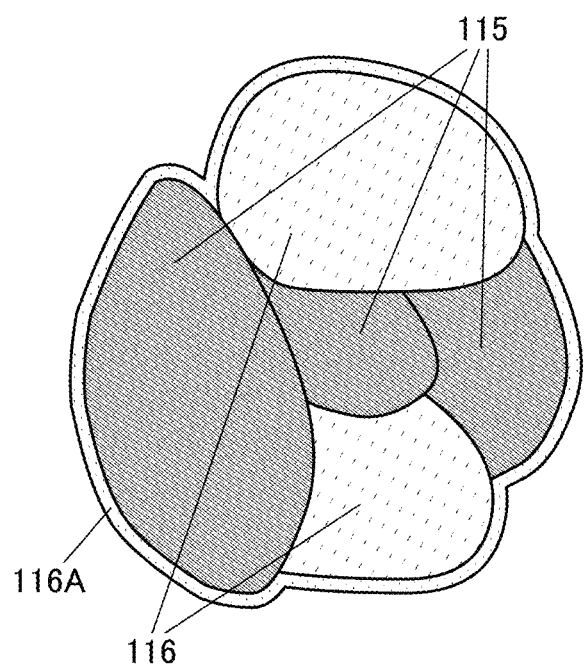

Note that the surface of the composite 111 may be provided with a thin film of the functional material 116A (see FIG. 3B). With such a structure, the stress applied on the surface of the composite 111A is further relieved, and therefore, can further increase the cycle characteristics of the power storage device. The functional material 116A may be a material different to the functional material 116; however, the functional material 116A is preferably the same material as the functional material 116. By employing the same constituent element to the functional material 116A and the functional material 116, the adhesion between the functional materials 116 and 116A can be increased.

<Cross-Sectional Structure Example of Composite Particle 3>

Figure 4:
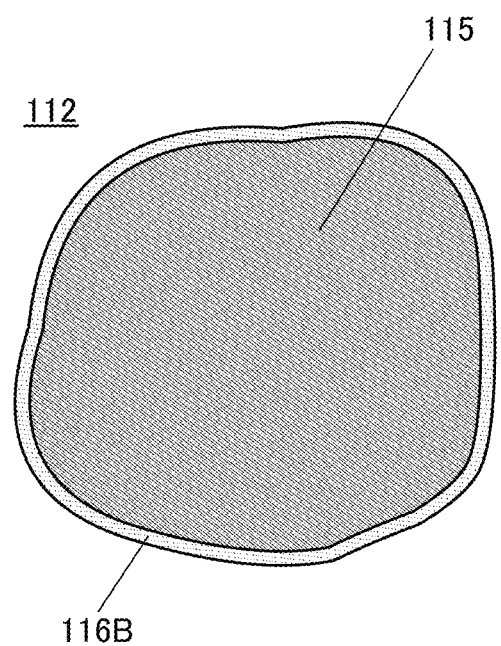
FIG. 4 illustrates a composite particle included in a negative electrode active material layer.

A composite 112 illustrated in FIG. 4 includes the negative electrode active material 115 and a functional material 116B. The negative electrode active material 115 includes a region in contact with the functional material 116B. Specifically, the surface of the negative electrode active material 115 is covered with the functional material 116B.

By forming the functional material 116B in contact with the negative electrode active material 115, stress caused by expansion or contraction of the negative electrode active material 115 can be relieved. Note that it is preferable that a chemical bond between the constituent atoms of the negative electrode active material 115 and the functional material 116B be formed at the interface between the negative electrode active material 115 and the functional material 116B.

A crack and separation caused by the occlusion and release of carrier ions of the negative electrode active material 115 are generated from the surface of the negative electrode active material 115 in many cases. Thus, by providing the functional material 116B to cover only the starting portion of the crack, the capacity of the power storage device in one embodiment of the present invention using the composite 112 can be even higher.

As the functional material 116B, a material similar to that of the functional material 116 or the functional material 116A can be used.

The aforementioned negative electrode can be used for the power storage device of one embodiment of the present invention.

[Fabricating Method of Negative Electrode Structure 1]

In this embodiment, silicon is used as the negative electrode active material 115 and titanium is used as the functional material 116. Hereinafter, the fabricating method of the above-described negative electrode 100 will be described.

First, silicon and titanium in particulate forms are prepared and weighed and mechanical mixing is performed. The weighing may be performed so that the amount of silicon is larger than that of titanium (e.g., the molecular ratio of silicon is more than or equal to 2 times and less than or equal to 8 times of titanium). Specifically, the mechanical mixing is performed by putting the materials that are weighed and a plurality of metallic balls into a metallic container, and rotating the container. The weight of the balls is, for example, more than or equal to 10 times the total weight of the materials. By adjusting the spinning rate of the container, the number of balls, the treatment time of the mechanical mixing and the like, the composite 110 and/or the composite 111 that have/has an appropriate particle size can be obtained. Thus, nanoparticles of a mixture or a compound of an active material and the functional material with an appropriate particle size or a mixture of the active material and the functional material and nanoparticles formed of a compound of the active material and the functional material can be generated.

Note that by forming the functional material 116A by a barrel-sputtering method over the surface of the composite 110 and/or composite 111 as described above, the composite 110A and/or the composite 111A can be obtained. Alternatively, by forming the functional material 116B by the barrel-sputtering method over the surface of the silicon in particulate forms, the composite 112 can be obtained. The barrel-sputtering method is a film formation method in which the target is fixed to the inside of the container having a cross section in a shape such as a polygon or a circle, applying the sample in particulate forms that is the film formation target, and performing sputtering and rotating the container in vacuum. By using the barrel-sputtering method, a film including the constituent element of the target covering each surface of the particles can be formed. It is preferable that the film thickness of the functional material 116A which is formed by the barrel-sputtering method be more than or equal to 10 nm and less than or equal to 200 nm.

Alternatively, the functional material 116A may be formed over the surfaces/surface of the composite 110 and/or the composite 111 by a sol-gel method.

The composite described hereinafter includes at least one of the composites 110, 111, 110A, 111A and 112.

Here, the particle size of the composite will be described. The composite particles with a size larger than that of the conductive additive are difficult to uniformly mix with the conductive additive, so that a favorable conductive path cannot be formed in some cases. Moreover, in the case where the particle size is large, stress to the surfaces of the particles increases because the surface area is small relative to volume increase, and the particles are likely to be cracked in some cases. In contrast, when the particle size of the composite is too small, the surface area of the composite increases, promoting the decomposition reaction of an electrolytic solution. This reduces charge and discharge efficiency, leading to lower capacity in some cases. Therefore, the particle size of the composite has certain optimum values. For example, the particle size of the composite is preferably greater than or equal to 0.001 µm and less than or equal to 20 µm, more preferably greater than or equal to 0.1 µm and less than or equal to 20 µm, still more preferably greater than or equal to 0.5 µm and less than or equal to 5 µm.

Silicon, which is prepared in order to obtain the composite with the particle size in the above range, can be obtained by grinding not in particulate forms (e.g., silicon wafer). Alternatively, silicon particles with a large size may be ground to obtain silicon particles with a desired size. Examples of grinding methods include grinding using a mortar and grinding using a ball mill. For another example, after grinding using the mortar, grinding using the ball mill may be performed. Here, the case of treatment with the ball mill will be described as an example. One or more raw materials are weighed and added to the solvent and the mixture is rotated with the use of metallic balls or ceramic balls. With the ball mill treatment, the raw materials can be mixed and formed into minute particles at the same time, so that the obtained electrode material can be minute particles. Further, with the ball mill treatment, the raw materials can be mixed uniformly.

The conductive additive, the composite in particulate forms, and the binder are added to and mixed with the solvent. The mixing ratio of them is appropriately adjusted in accordance with desired battery properties.

As the solvent, a liquid in which a raw material is not dissolved but dispersed can be used. Furthermore, the solvent is preferably a polar solvent. For example, one of water, methanol, ethanol, acetone, tetrahydrofuran (THF), dimethylformamide (DMF), N-methyl-2-pyrrolidone (NMP), and dimethyl sulfoxide (DMSO) or a mixed solution of two or more of the polar solvents can be used.

As the binder, a binder with high heat resistance, such as polyimide, is used. Note that a substance mixed in the mixing step is a precursor of polyimide, and the precursor of polyimide is imidized in a heating step performed later to be polyimide.

To mix the compounds, a mixer is used, for example. The binder, the composite, and the solvent are mixed and stirred in the mixer to form slurry (mixture).

Next, the slurry is applied to the negative electrode current collector 101, and the negative electrode current collector to which the slurry is applied is dried to remove the solvent. The drying step is performed at room temperature in a dry atmosphere, for example. Note that in the case where the solvent can be removed in the heating step performed later, the drying step is not necessarily performed.

Next, the negative electrode current collector to which the slurry is applied is heated. The heating temperature is higher than or equal to 200° C. and lower than or equal to 400° C., preferably approximately 300° C. The heating temperature is kept for more than or equal to 1 hour and less than or equal to 2 hours, preferably approximately 1 hour. Through the heating step, the slurry is baked and thus the precursor of polyimide is imidized to be polyimide.

In this embodiment, the heating step for baking the slurry is performed at a temperature at which the binder is not decomposed, for example, higher than or equal to 200° C. and lower than or equal to 400° C., preferably 300° C. This makes it possible to prevent decomposition of the binder and a decrease in the reliability of the power storage device.

Through the above-described fabrication steps, the negative electrode 100 in which the negative electrode active material layer 102 is provided over the negative electrode current collector 101 can be fabricated.

[Negative Electrode Structure 2]

Described next will be the negative electrode of a power storage device that includes the negative electrode current collector and the negative electrode active material layer that includes the composite in particulate forms, graphene, and a binder and that is provided over the negative electrode current collector.

Graphene serves as the conductive additive that forms an electron conducting path between the composite and the current collector. Note that graphene in this specification refers to single-layer graphene or multilayer graphene including two or more and one hundred or less layers. Single-layer graphene refers to a sheet of one atomic layer of carbon molecules having $\pi$ bonds. When graphene oxide is reduced to form graphene, oxygen contained in the graphene oxide is not entirely released and part of the oxygen remains in the graphene. When the graphene contains oxygen, the proportion of the oxygen measured by X-ray photoelectron spectroscopy (XPS) is higher than or equal to 2 at. % and lower than or equal to 20 at. % of the whole graphene, preferably higher than or equal to 3 at. % and lower than or equal to 15 at. % of the whole graphene. Note that graphene oxide refers to the compound formed by oxidizing the graphene.

The binder can be formed using any of the materials of the binder described above. In particular, when silicon or the like whose volume changed markedly due to charge and discharge is used as the negative electrode active material that forms the composite, the use of polyimide with a high binding property enhance adhesion between the composites in particulate forms, the composite in particulate forms and graphene, and the composite in particulate forms and the current collector, and graphene and the current collector. Thus, separation and pulverization of the composite are suppressed, which makes it possible to obtain excellent charge-discharge cycle performance.

With the use of the negative electrode active material layer containing the composite in particulate forms, graphene, and the binder as described above, graphene flakes and particles of the alloy-based material have a surface contact so that the sheet surrounds the particles, and graphene flakes also have surface contact to overlap with each other; thus, an extensive network of three-dimensional electron conducting paths is established in the negative electrode active material layer. For this reason, it is possible to form the negative electrode active material layer with higher electron conductivity than the negative electrode active material layer containing acetylene black (AB) particles or ketjen black (KB) particles, which are conventionally used as a conductive additive and have an electrical point contact with the negative electrode active material.

Graphene flakes can be bonded to each other to form net-like graphene (hereinafter referred to as a graphene net). The graphene net covering the composite can function as a binder for binding particles. Thus, the amount of the binder can be reduced, or the binder does not have to be used. This can increase the proportion of the composite in the electrode volume or weight. That is to say, the capacity of the power storage device can be increased.

Figure 5A:
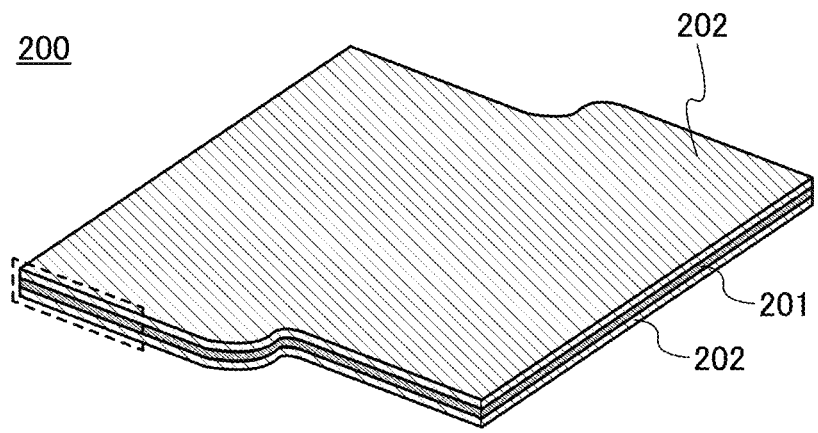
FIGS. 5A to 5D illustrate a negative electrode.
Figure 5B:
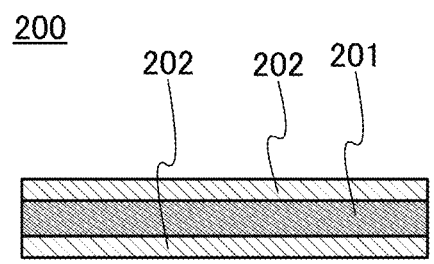

FIG. 5A is an overhead view of a negative electrode, and FIG. 5B is an enlarged view of a cross-section of a portion surrounded by a broken line in FIG. 5A. A negative electrode 200 has a structure in which a negative electrode active material layer 202 is provided over a negative electrode current collector 201. Although the negative electrode active material layers 202 are provided so that the negative electrode current collector 201 is sandwiched therebetween in FIGS. 5A and 5B, the negative electrode active material layer 202 may be formed over only one surface of the negative electrode current collector 201.

The negative electrode current collector 201 can be the same as the negative electrode current collector 101.

Figure 5C:
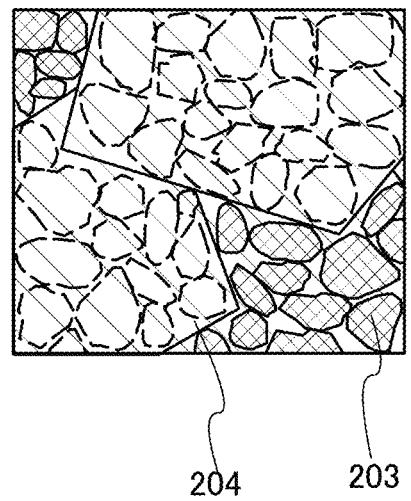

FIG. 5C is a top view of the negative electrode active material layer 202 including a composite 203, graphene flakes 204 that cover the plurality of composites 203, and a binder (not illustrated). Different graphene flakes 204 cover the surfaces of the plurality of composites 203. The composites 203 may partly be exposed. Note that the composites 203 is the above-described composite 110 and/or the composite 111.

The graphene flake 204 is a thin film having a thickness corresponding to the thickness of a single layer or a multilayer of carbon molecules. The plurality of graphene flakes 204 is formed in such a way as to wrap, cover, or adhere to surfaces of plurality of composites 203 in particulate forms, so that the plurality of graphene flakes 204 make surface contact with the plurality of composites 203 in particulate forms. Furthermore, the graphene flakes 204 are also in surface contact with each other; consequently, the plurality of graphene flakes 204 forms a three-dimensional electrical conduction network.

This is because the graphene oxide with extremely high dispersibility in a polar solvent is used for the formation of the graphene flakes 204 as described below. The solvent is removed by volatilization from a dispersion medium in which graphene oxide is uniformly dispersed, and the graphene oxide is reduced to form graphene; hence, the graphene flakes 204 remaining in the negative electrode active material layer 202 partly overlap with each other and are dispersed such that surface contact is made, thereby forming an electrical conduction path.

Unlike a conventional conductive additive in particulate forms, such as acetylene black, which makes point contact with an active material, the graphene flake 204 is capable of surface contact with low contact resistance; accordingly, the electrical conduction between the composite 203 in particulate forms and the graphene flake 204 can be improved without an increase in the amount of a conductive additive. Thus, the proportion of the composites 203 in the negative electrode active material layer 202 can be increased. Consequently, the capacity of the power storage device can be increased. The weight of the graphene flake 204 used for the negative electrode active material layer 202 is preferably less than or equal to 30%, more preferably less than or equal to 15%, still more preferably less than or equal to 3% of that of the composites 203. Note that the weight of graphene obtained by reducing graphene oxide is approximately half that of the graphene oxide.

As described above, the negative electrode active material layer 202 includes graphene as the conductive additive to improve the characteristics of an electron conducting path in the negative electrode active material layer 202, and in addition to graphene, the negative electrode active material layer 202 may include various conductive additives, for example, carbon particles such as acetylene black particles, ketjen black particles, and carbon nanofibers.

The composite 203 includes at least one of the above-described composites 110, 111, 110A, and 111A.

Figure 5D:
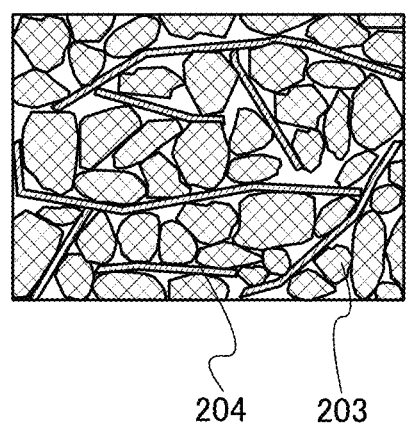

FIG. 5D is a cross-sectional view of part of the negative electrode active material layer 202. The plurality of composites 203 and the graphene flake 204 that covers the composite 203 are included. The graphene flakes 204 are observed to have linear shapes in the cross-sectional view. The plurality of composites 203 are at least partly surrounded with one graphene flake 204 or a plurality of graphene flakes 204 or sandwiched between a plurality of graphene flakes 204. Note that the graphene flake 204 has a bag-like shape, and the plurality of composites 203 are at least partly surrounded with the graphene flake 204 in some cases. In addition, the composites 203 are partly not covered with the graphene flake 204 and exposed in some cases.

The graphene flakes 204 form a three-dimensional network. The graphene network has a function of holding the composite 203 capable of occluding and releasing carrier ions as well as a function as a conductive additive. That is, the graphene flakes 204 also serve as a binder. Thus, the amount of the binder can be reduced. This can increase the proportion of the composite 203 in the negative electrode active material layer 202, leading to higher discharge capacity of the power storage device.

In the composite 203 whose volume is increased by occlusion of carrier ions, the negative electrode active material layer 202 gets friable by charge and discharge, and thus the negative electrode active material layer 202 might be partly broken. The negative electrode active material layer 202 that is partly broken decreases the reliability of the power storage device. However, the graphene flake 204 covering the periphery of the composite 203 can prevent dispersion of the composite 203 and the collapse of the negative electrode active material layer 202, even when the volume of the composite 203 is increased and decreased by charge and discharge. In other words, the graphene flake 204 has a function of keeping the bond between the composites 203 even when the volume of the composite 203 is increased and decreased by charge and discharge.

In the case where a power storage device such as a secondary battery is used in a flexible display device, a flexible electronic device, or the like, the power storage device is provided in a flexible portion (part or the whole of a housing). In this case, the power storage device is bent with the flexible portion, so that repeated change in the form of the power storage device might cause separation between the negative electrode current collector 201 and the composite 203 in the power storage device. As a result, deterioration of the power storage device might be promoted.

The graphene flakes are also in surface contact with each other; consequently, the plurality of graphene flakes form a three-dimensional network for electronic conduction. The graphene network is less likely to be broken by deformation (e.g., bending) because graphene has flexibility and high strength. Thus, a favorable conductive path can be maintained even after repeated deformation. Particularly in the case where a graphene flake has a bag-like shape and the composite 203 is at least partly surrounded with the graphene flake, separation of the composite 203 due to bending hardly occurs and thus the electrode layer is less likely to be collapsed.

The aforementioned negative electrode can be used for the power storage device of one embodiment of the present invention.

[Fabricating Method of Negative Electrode Structure 2]

The negative electrode active material layer 202 in the negative electrode 200 of one embodiment of the present invention includes the graphene flakes 204 as described above. Graphene can be obtained, for example, by mixing graphene oxide that is a raw material of graphene, the composite 203, and the binder and then thermally reducing the mixture. An example of a method for fabricating such a negative electrode will be described below.

First, graphene oxide as a raw material of graphene is formed. Graphene oxide can be formed by any of a variety of synthesis methods such as a Hummers method, a modified Hummers method, or oxidation of a graphite material.

For example, in the Hummers method, graphite such as flake graphite is oxidized to give graphite oxide. The obtained graphite oxide is graphite which is oxidized in places and thus to which a functional group such as a carbonyl group, a carboxyl group, or a hydroxyl group is bonded. In the graphite oxide, the crystallinity of the graphite is lost and the distance between layers is increased. Therefore, graphene oxide can be easily obtained by separation of the layers from each other by ultrasonic treatment or the like. Note that the length of one side (also referred to as a flake size) of graphene oxide that is formed is preferably several micrometers to several tens of micrometers.

Next, graphene oxide obtained by the above-described method or the like, the composite 203 in particulate forms, and the binder are added to and mixed with a solvent. The mixing ratio thereof is adjusted appropriately depending on the desired battery characteristics. For example, the ratio of the negative electrode active material in particulate forms to graphene oxide and the binder can be 80:5:15 (wt %).

As the solvent, a liquid in which a raw material is not dissolved but dispersed can be used. Furthermore, the solvent is preferably a polar solvent. For example, one of water, methanol, ethanol, acetone, tetrahydrofuran (THF), dimethylformamide (DMF), N-methyl-2-pyrrolidone (NMP), and dimethyl sulfoxide (DMSO) or a mixed solution of two or more of the polar solvents can be used.

As the binder, a binder with high heat resistance, such as polyimide, is used. Note that a substance mixed in the mixing step is a precursor of polyimide, and the precursor of polyimide is imidized in a heating step performed later to be polyimide.

Note that graphene oxide flakes are not easily aggregated in the solution having polarity because the graphene oxide flakes are negatively charged due to functional groups included in the graphene oxide flakes. Thus, the graphene oxide flakes are easily uniformly dispersed in the solution having polarity. Particularly when added to and mixed with the solvent in the initial step of the mixing steps, graphene oxides are more likely to disperse uniformly in the solvent. Consequently, graphene flakes are dispersed uniformly in the negative electrode active material particles, which enables the negative electrode active material particles with high electric conductivity to be formed.

To mix the compounds, a mixer is used, for example. An example of a mixer is a planetary mixer. The binder, the active material, and the solvent are mixed and stirred in the mixer to form slurry (mixture).

Here, there is no particular limitation on the sequence of adding graphene oxide, the composite 203 in particulate forms, and the binder to the solvent. For example, the composite 203 in particulate forms are added to and mixed with the solvent, graphene oxide is added to and mixed with the mixture, and then the binder is added thereto and mixed therewith. To adjust the viscosity of the mixture, the solvent may be additionally added in each of the mixing steps.

An example of the mixing method will be described. First, the solvent is added to the composite 203 and they are mixed in the mixer. For example, NMP is used as the solvent. Then, graphene oxide is added to the mixture and the obtained mixture is kneaded. Here, kneading refers to mixing something in a highly viscous state. The kneading can separate aggregation of the graphene oxide and uniformly disperse the composite 203 and the graphene oxide. The solvent may be added in the kneading. The sum of the amount of the solvent added in the process up to the kneading step is preferably greater than or equal to 0.46 ml and less than or equal to 0.80 ml per gram of the active material. Then, the binder is added to the mixture and they are mixed in the mixer. An example of the binder is polyimide. Another solvent is further added and mixing is performed in the mixer.

Through the above steps, the composite 203 in particulate forms, the graphene oxide, the binder, and the solvent are mixed to form slurry (mixture).

Next, the slurry is applied to the negative electrode current collector 201, and the negative electrode current collector to which the slurry is applied is dried to remove the solvent. The drying step is performed at room temperature in a dry atmosphere, for example. Note that in the case where the solvent can be removed in the heating step performed later, the drying step is not necessarily performed.

Next, the negative electrode current collector to which the slurry is applied is heated. The heating temperature is higher than or equal to 200° C. and lower than or equal to 400° C., preferably approximately 300° C. The heating temperature is kept for more than or equal to 1 hour and less than or equal to 2 hours, preferably approximately 1 hour. Through the heating step, the slurry is baked and thus the precursor of polyimide is imidized to be polyimide. Through the heating step, the reduction of the graphene oxide occurs, so that graphene can be formed. At the same time, graphene oxide is reduced to form graphene. Heating for baking the slurry and heating for reducing graphene oxide can be performed through one heating step as described above; thus, there is no need for performing two heating steps. That is, the number of steps for fabricating the negative electrode can be reduced.

In this embodiment, the heating step for baking the slurry and reducing graphene oxide is performed at a temperature at which the binder is not decomposed, for example, higher than or equal to 200° C. and lower than or equal to 400° C., preferably 300° C. This makes it possible to prevent decomposition of the binder and a decrease in the reliability of the power storage device. Note that the weight of graphene obtained by reducing graphene oxide is approximately half that of the graphene oxide.

In addition, the reduced graphene oxide (i.e., graphene) has low dispersibility because a functional group is released. In the case of using graphene oxide that is reduced before being mixed with the composite 203 and the binder, graphene is not uniformly mixed with the composite 203 and the like; consequently, the power storage device might have poor electrical characteristics. This results from the fact that graphene oxide flakes are negatively charged due to the bond between functional groups containing oxygen and surfaces of graphene oxide flakes and thus are dispersed by occurrence of the repulsion between graphene oxide flakes or the repulsion between graphene oxide flakes and the polar solvent, whereas graphene that is obtained by reducing graphene oxide lose many of functional groups due to the reduction and have low dispersibility accordingly.

In the negative electrode active material layer formed by mixing graphene oxide and the composite 203 and then heating the mixture, graphene is uniformly dispersed in the negative electrode active material layer because graphene oxide is dispersed before functional groups are reduced by the reduction. For this reason, the power storage device with high electric conductivity can be obtained by performing reduction treatment after graphene oxide is dispersed.

Through the above-described fabrication steps, the negative electrode 200 in which the negative electrode active material layer 202 is provided over the negative electrode current collector 201 can be fabricated.

A variety of power storage devices can be fabricated using the above-described negative electrode. Examples of the power storage devices include a battery, a secondary battery, and a lithium-ion secondary battery. In addition, a capacitor is given as another example of the power storage devices. For example, with a combination of the electrode member of one embodiment of the present invention as the negative electrode and an electric double layer positive electrode, the capacitor such as a lithium-ion capacitor can be fabricated.

This embodiment can be combined with any of the other embodiments as appropriate.

Embodiment 2

In this embodiment, the structure of the power storage device including the negative electrode fabricated by the fabricating method described in Embodiment 1 will be described with reference to FIGS. 6A to 6C, FIGS. 7A and 7B, FIG. 8, and FIGS. 9A and 9B. Structural examples of power storage devices (storage batteries) will be described with reference to FIGS. 10A and 10B, FIGS. 11A and 11B, FIGS. 12A to 12C, FIGS. 13A to 13C, and FIGS. 14A and 14B. Examples of electrical devices will be described with reference to FIGS. 15A1, 15A2, 15B1, and 15B2.

[Coin-Type Storage Battery]

Figure 6A:
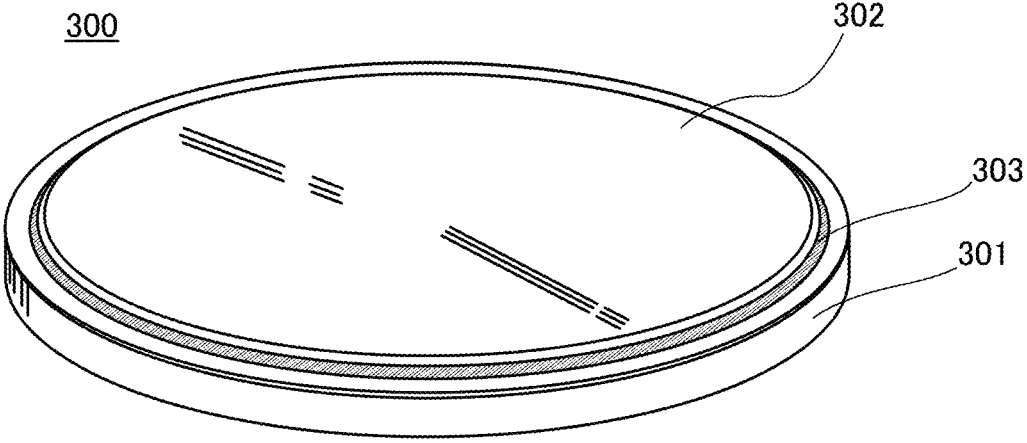
FIGS. 6A to 6C illustrate a coin-type storage battery.
Figure 6B:
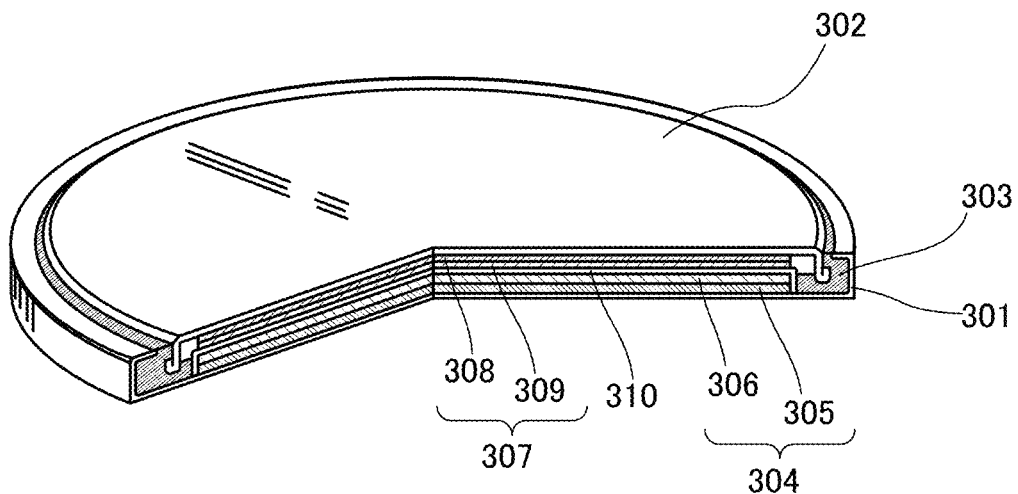

FIG. 6A is an external view of a coin-type (single-layer flat type) storage battery, and FIG. 6B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. Here, the negative electrode for the power storage device that is described in Embodiment 1 is used as a negative electrode 307.

A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the positive electrode active materials. As a conductive additive, a material that has a large specific surface area is preferably used; for example, acetylene black (AB) can be used. Alternatively, a carbon material such as a carbon nanotube, graphene, or fullerene can be used.

The negative electrode 307 includes a negative electrode current collector 308 and a negative electrode active material layer 309 provided in contact with the negative electrode current collector 308. The negative electrode for the power storage device that is described in Embodiment 1 is used as the negative electrode 307.

A separator 310 and an electrolyte (not illustrated) are included between the positive electrode active material layer 306 and the negative electrode active material layer 309.

The separator 310 can be formed using an insulator such as cellulose (paper), polypropylene with pores, or polyethylene with pores.

As an electrolyte of an electrolytic solution, a material that contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium or potassium) or an alkaline-earth metal (e.g., calcium, strontium, barium, beryllium, or magnesium) may be used for the electrolyte.

As a solvent of the electrolytic solution, a material with the carrier ion mobility is used. As the solvent of the electrolytic solution, an aprotic organic solvent is preferably used. Typical examples of the aprotic organic solvent include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like.

Alternatively, the use of one or more kinds of ionic liquids (room temperature molten salts) which have features of non-flammability and non-volatility as the solvent of the electrolytic solution can prevent the storage battery from exploding or catching fire even when the storage battery internally shorts out or the internal temperature increases owing to overcharging or the like. An ionic liquid contains a cation and an anion. Examples of the organic cation used for the electrolytic solution are aliphatic onium cations, such as a quaternary ammonium cation, a tertiary sulfonium cation, and a quaternary phosphonium cation, and aromatic cations, such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

An aliphatic quaternary ammonium cation, which has higher reduction resistance, has a particularly excellent effect of inhibiting decomposition of an electrolytic solution with charge and discharge of the power storage device. The use of the aliphatic quaternary ammonium cation leads to suppression of a decrease in the capacity by charge and discharge and favorable cycle characteristics. Furthermore, the capacity of the power storage device can be increased.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 6B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging the power storage device will be described with reference to FIG. 6C. When a secondary battery using lithium ions is regarded as a closed circuit, lithium ions transfer and a current flows in the same direction. Note that in the secondary battery using lithium ions, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Figure 6C:
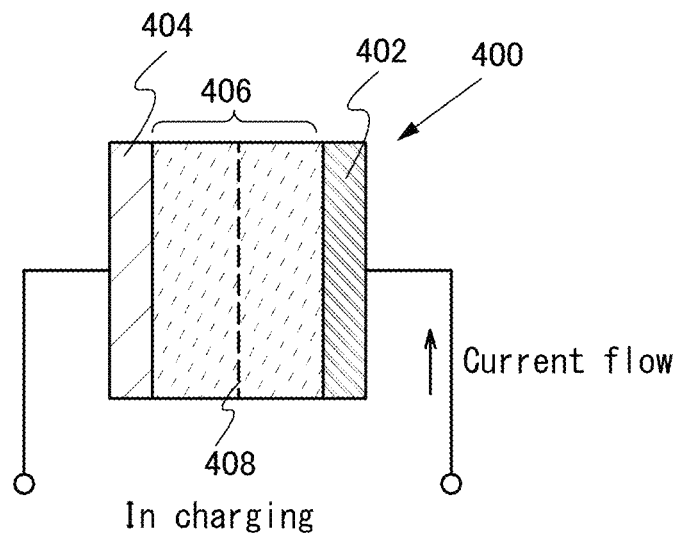

Two terminals in FIG. 6C are connected to a charger, and a storage battery 400 is charged. As the charge of the storage battery 400 proceeds, a potential difference between electrodes increases. The positive direction in FIG. 6C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, the direction of a charging current is the direction of a flow of a current.

[Cylindrical Storage Battery]

Figure 7A:
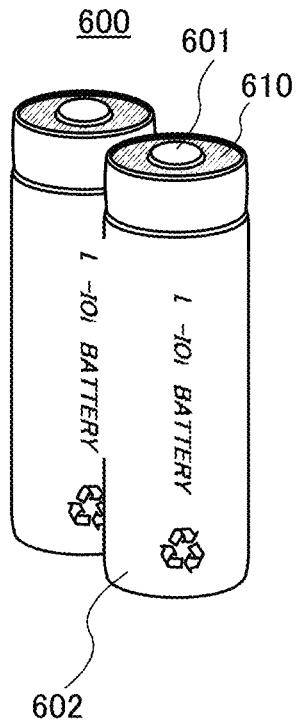
FIGS. 7A and 7B illustrate a cylindrical storage battery.

Next, an example of a cylindrical storage battery will be described with reference to FIGS. 7A and 7B. As illustrated in FIG. 7A, the cylindrical storage battery 600 includes a positive electrode cap (battery cap) 601 on the top surface and a battery can (outer can) 602 on the side surface and bottom surface. The positive electrode cap and the battery can 602 are insulated from each other by a gasket (insulating gasket) 610.

Figure 7B:
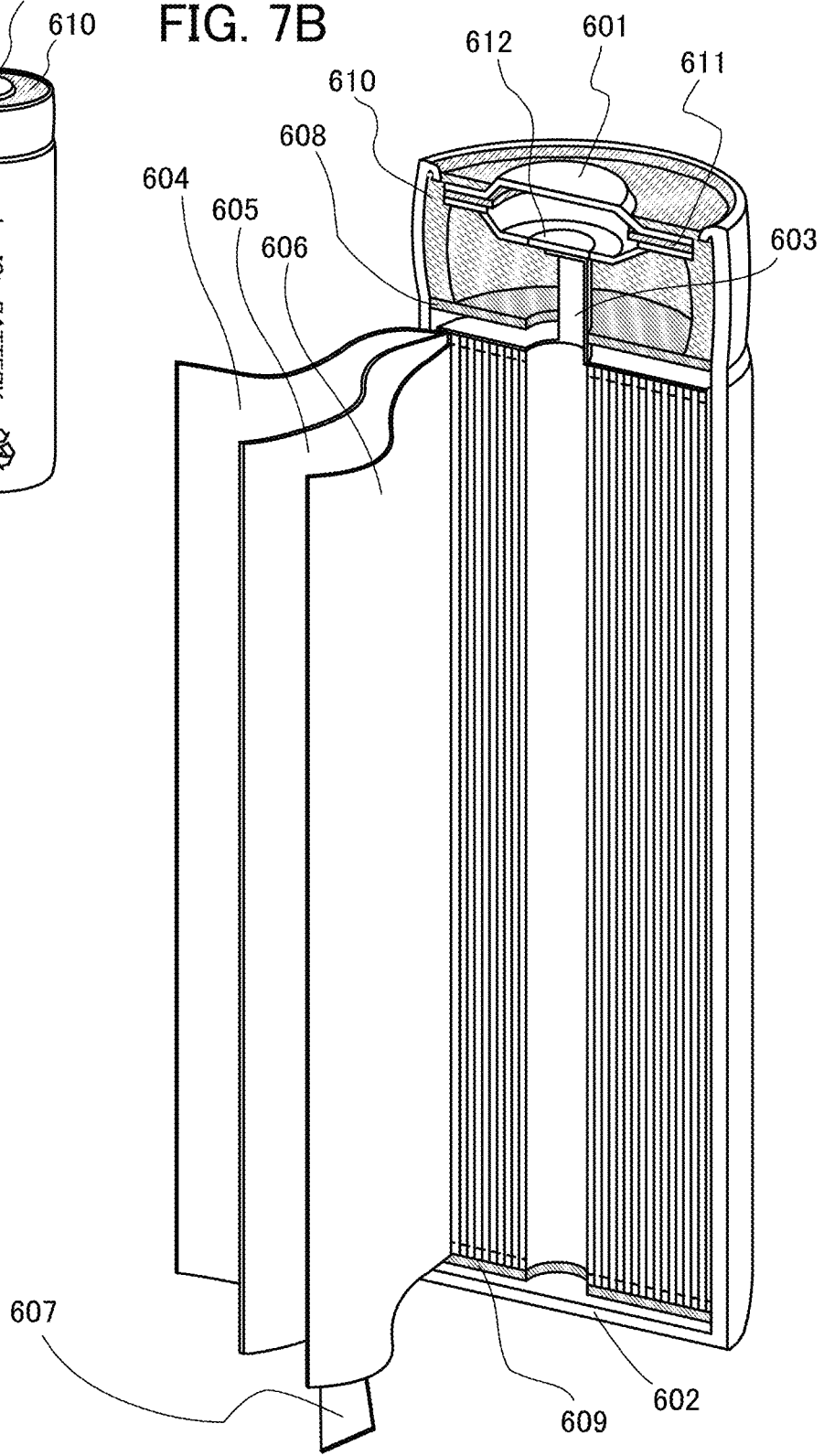

FIG. 7B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a strip-like separator 605 interposed therebetween is provided. Although not illustrated, the battery element is wound around a center pin. One end of the battery can 602 is closed and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion caused by the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The negative electrode for the power storage device that is described in Embodiment 1 is used as the negative electrode 606. Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic or the like can be used for the PTC element.

[Thin Storage Battery]

Next, an example of a thin storage battery will be described with reference to FIG. 8. When a flexible thin storage battery is used in an electronic device at least part of which is flexible, the storage battery can be bent as the electronic device is bent.

Figure 8:
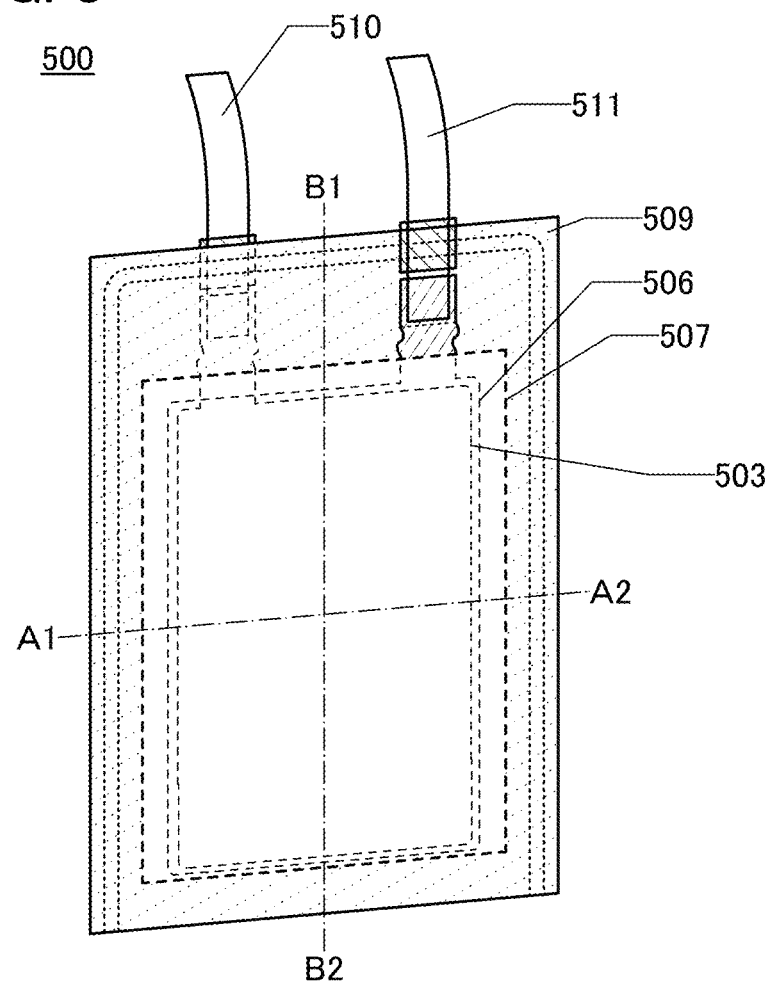
FIG. 8 illustrates a thin storage battery.
Figure 9A:
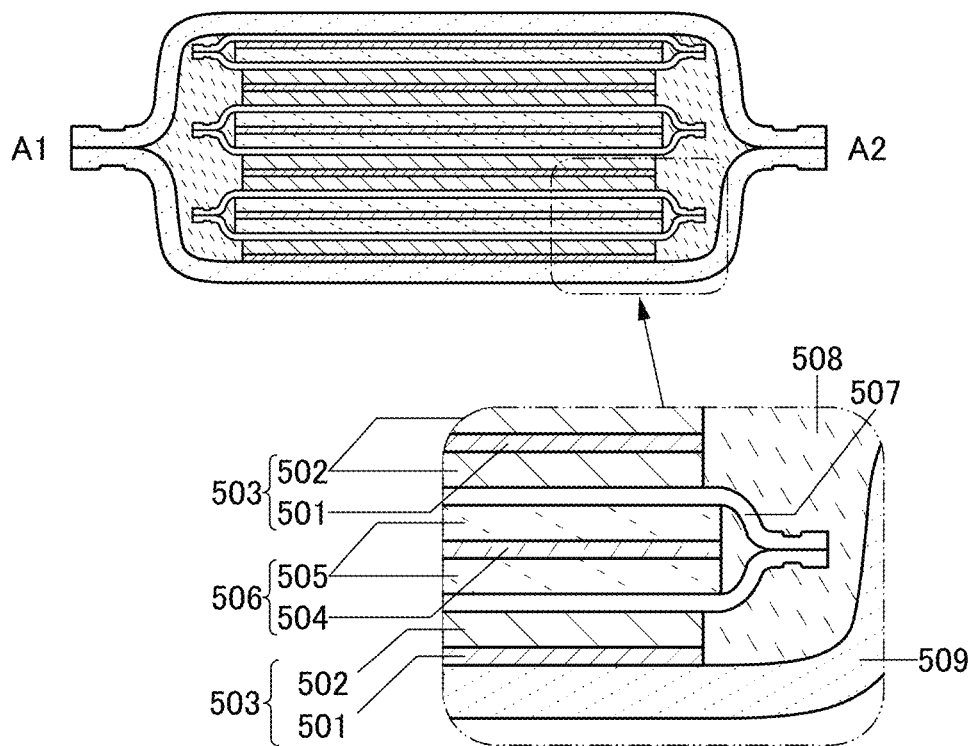
FIGS. 9A and 9B illustrate flexible thin storage batteries.
Figure 9B:
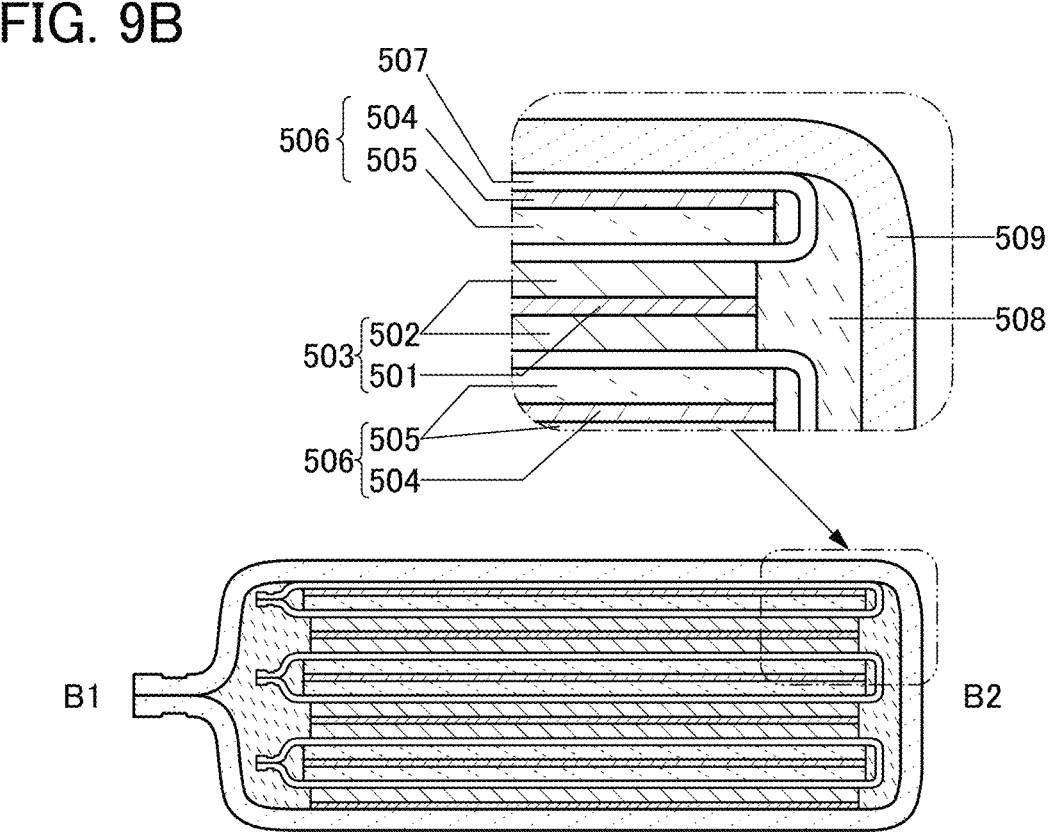

FIG. 8 is an external view of a thin storage battery 500. FIG. 9A is a cross-sectional view along dashed-dotted line A1-A2 in FIG. 8, and FIG. 9B is a cross-sectional view along dashed-dotted line B1-B2 in FIG. 8. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509. The negative electrode for the power storage device that is described in Embodiment 1 is used as the negative electrode 506.

Figure 10A:
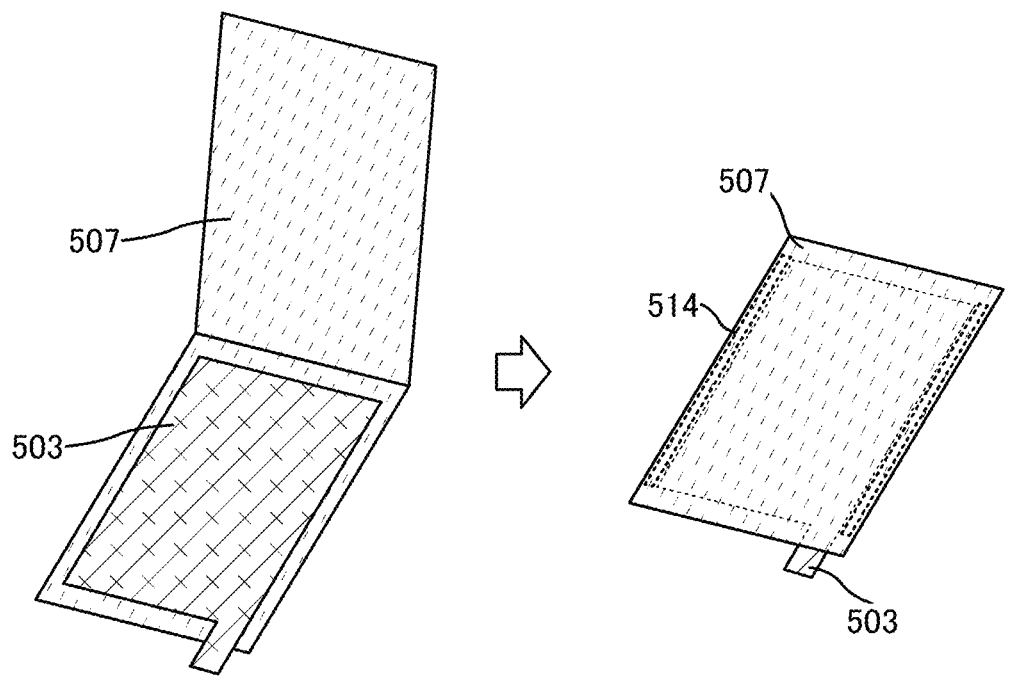
FIGS. 10A and 10B illustrate a thin storage battery.
Figure 10B:
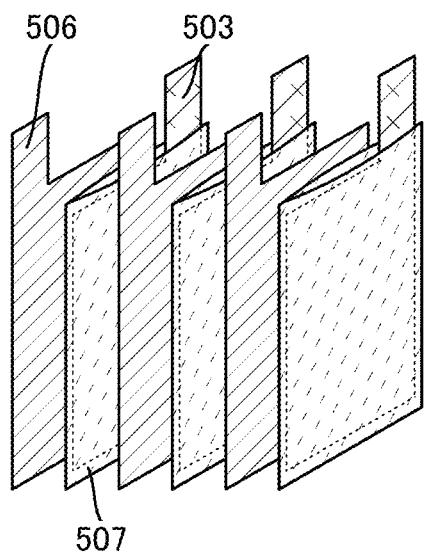

The separator 507 is preferably formed to have a bag-like shape to surround one of the positive electrode 503 and the negative electrode 506. For example, as illustrated in FIG. 10A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 10B, the positive electrodes 503 surrounded by the separators 507 and the negative electrodes 506 are alternately stacked and provided in the exterior body 509, whereby the thin storage battery 500 can be formed.

Figure 11A:
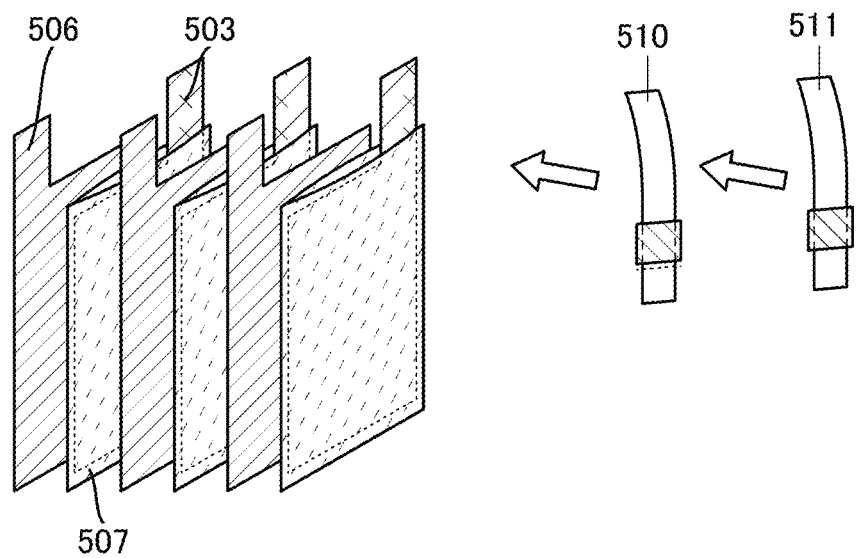
FIGS. 11A and 11B illustrate a thin storage battery.
Figure 11B:
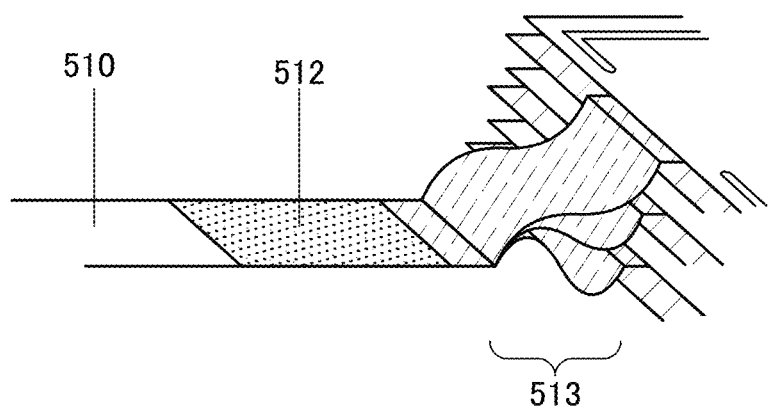

FIG. 11B illustrates an example where a current collector is welded to a lead electrode. An example where the positive electrode current collector 501 is welded to the positive electrode lead electrode 510 is illustrated. The positive electrode current collector 501 is welded to the positive electrode lead electrode 510 in a welding region 512 by ultrasonic welding or the like. The positive electrode current collector 501 includes a bent portion 513 as illustrated in FIG. 11B, and it is therefore possible to relieve stress due to external force applied after fabrication of the storage battery 500. The reliability of the storage battery 500 can be thus increased.

In the thin storage battery 500 illustrated in FIG. 8 and FIGS. 9A and 9B, the positive electrode lead electrode 510 and a negative electrode lead electrode 511 are welded to the positive electrode current collectors 501 and the negative electrode current collectors 504, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged such that part of the positive electrode current collector 501 and part of the negative electrode current collector 504 are exposed to the outside of the exterior body 509 without using lead electrodes.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIG. 8 includes three electrode layers. It is needless to say that the number of electrode layers is not limited to three, and may be more than three or less than three. In the case of using a large number of electrode layers, the storage battery can have high capacity. In contrast, in the case of using a small number of electrode layers, the storage battery can have a small thickness and high flexibility.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Further, a structure in which a plurality of positive electrodes, a plurality of negative electrodes, and a plurality of separators are stacked or rolled may be employed.

For each of the negative electrodes of the storage batteries 300, 500, and 600, which are described in this embodiment, the negative electrode active material layer of one embodiment of the present invention can be used. Thus, the discharge capacity of the storage batteries 300, 500, and 600 can be increased. Further, it is possible to improve the cycle characteristics of the storage batteries.

Figure 12A:
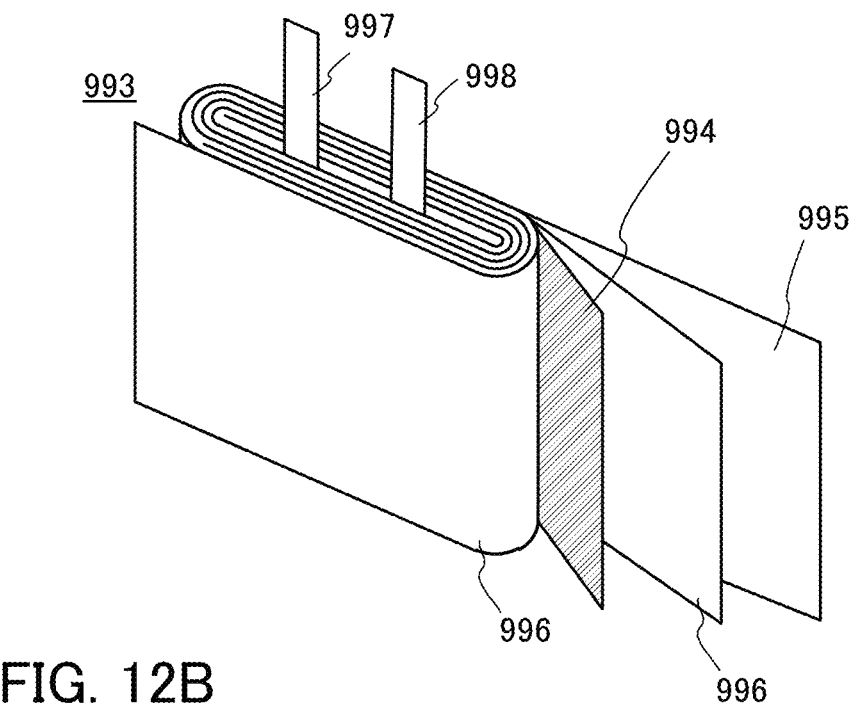
FIGS. 12A to 12C illustrate examples of power storage devices.
Figure 12B:
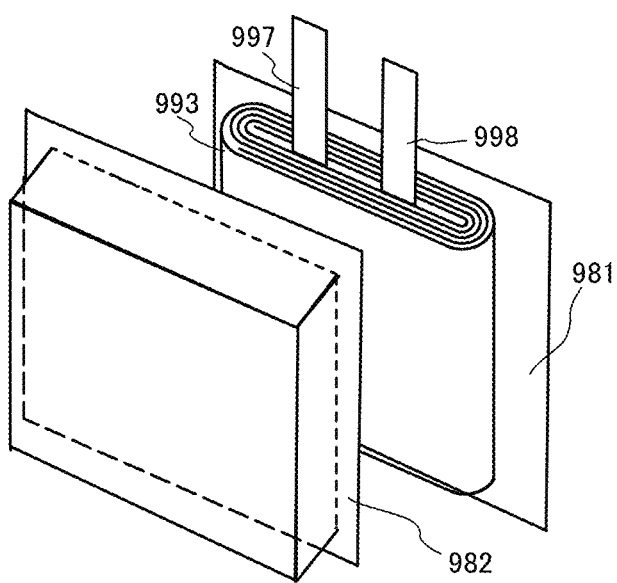
Figure 12C:
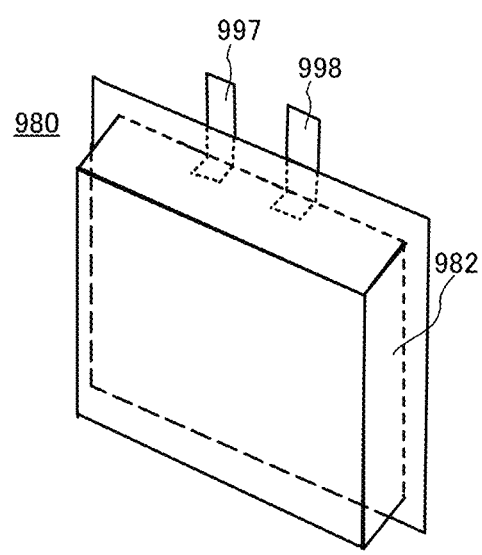

The thin storage battery is not limited to the one illustrated in FIG. 8. Another example of a thin storage battery is illustrated in FIGS. 12A to 12C. A wound body 993 illustrated in FIG. 12A includes a negative electrode 994, a positive electrode 995, and a separator 996.

The wound body 993 is obtained by winding a sheet of a stack in which the negative electrode 994 overlaps with the positive electrode 995 with the separator 996 provided therebetween. The wound body 993 is covered with a rectangular sealed container or the like; thus, a rectangular secondary battery is fabricated.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

In a power storage device 980 illustrated in FIGS. 12B and 12C, the wound body 993 is packed in a space formed by bonding a film 981 and a film 982 having a depressed portion by thermocompression bonding or the like. The wound body 993 includes the lead electrode 997 and the lead electrode 998, and is soaked in an electrolytic solution inside a space surrounded by the film 981 and the film 982 having the depressed portion.

For the film 981 and the film 982 having the depressed portion, a metal material such as aluminum or a resin material can be used, for example. With the use of the resin material for the film 981 and the film 982 having the depressed portion, the film 981 and the film 982 having the depressed portion can be changed in their forms when external force is applied; thus, a flexible storage battery can be fabricated.

Although FIGS. 12B and 12C illustrate an example where a space is formed by two films, the wound body 993 may be placed in a space formed by bending one film.

Furthermore, a flexible power storage device can be fabricated when a resin material or the like is used for the exterior body and the sealed container of the power storage device. Note that in the case where the resin material is used for the exterior body and the sealed container, a conductive material is used for a portion connected to the outside.

Figure 13A:
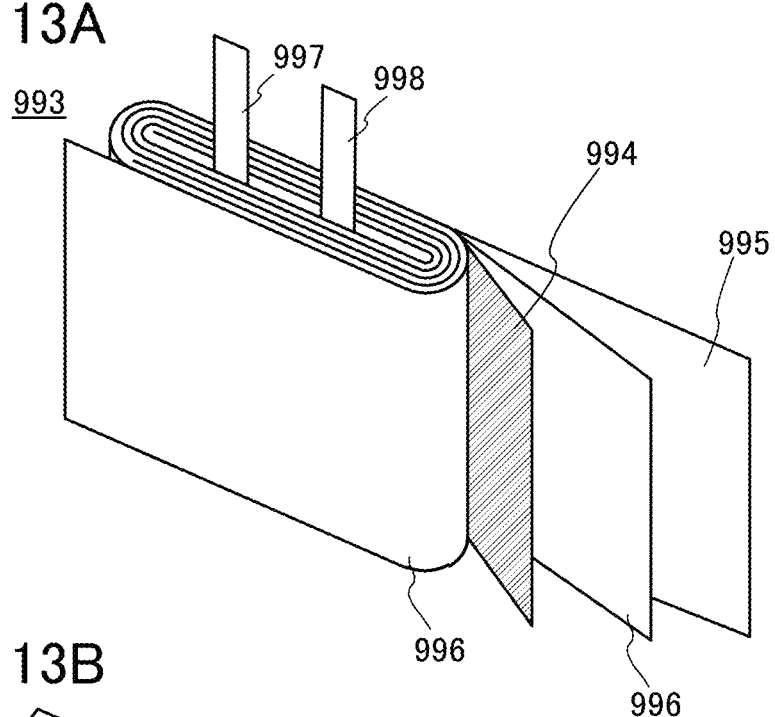
FIGS. 13A to 13C illustrate examples of power storage devices.
Figure 13B:
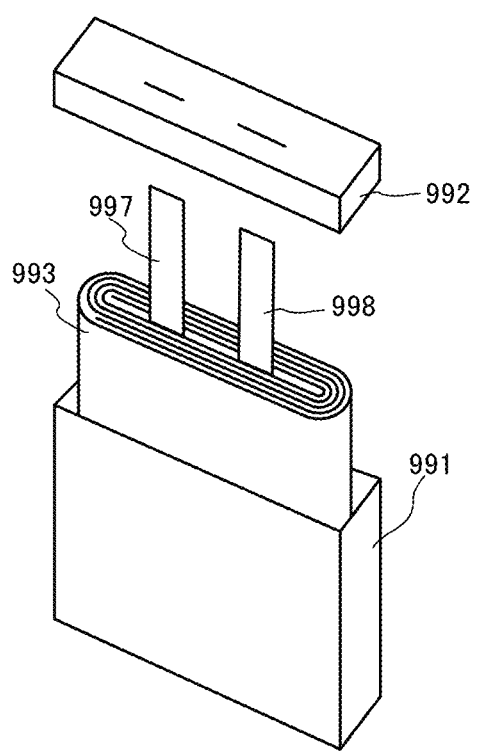
Figure 13C:
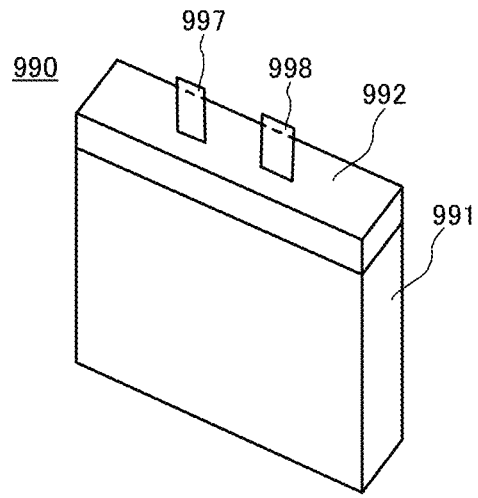

For example, FIGS. 13A to 13C illustrate an example of a flexible rectangular storage battery. The wound body 993 illustrated in FIG. 13A is the same as that illustrated in FIG. 12A, and the detailed description thereof is omitted.

In the power storage device 990 illustrated in FIGS. 13B and 13C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or the resin material can be used for the exterior bodies 991 and 992. With the use of the resin material for the exterior bodies 991 and 992, the exterior bodies 991 and 992 can be changed in their forms when external force is applied; thus, the flexible rectangular storage battery can be fabricated.

Structural examples of power storage devices (power storage units) will be described with reference to FIGS. 14A and 14B, FIGS. 15A1, 15A2, 15B1, and 15B2, and FIGS. 16A and 16B.

Figure 14A:
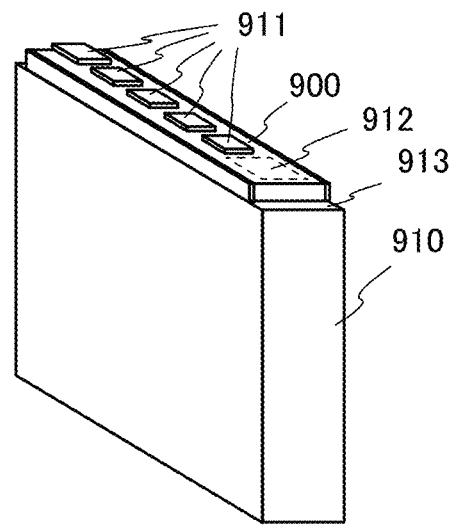
FIGS. 14A and 14B illustrate an example of power storage devices.
Figure 14B:
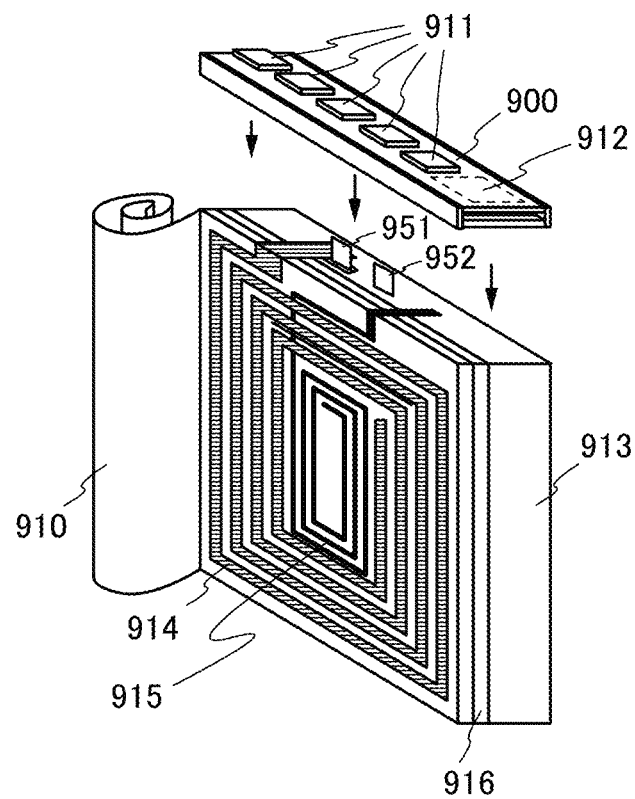

FIGS. 14A and 14B show external views of the power storage device. The power storage device includes a circuit board 900 and a power storage unit 913. A label 910 is attached to the power storage unit 913. As shown in FIG. 14B, the power storage device further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the power storage unit 913 and the antennas 914 and 915. The layer 916 has a function of blocking an electromagnetic field from the power storage unit 913, for example. As the layer 916, for example, a magnetic body can be used.

Note that the structure of the power storage device is not limited to that in FIGS. 14A and 14B.

For example, as illustrated in FIGS. 15A1 and 15A2, two opposite sides of the power storage unit 913 in FIGS. 14A and 14B may be provided with the respective antennas. FIG. 15A1 is an external view showing one side of the opposite surfaces, and FIG. 15A2 is an external view showing the other side of the opposite surfaces. Note that for the same portions as the power storage device in FIGS. 14A and 14B, description on the power storage device in FIGS. 14A and 14B can be referred to as appropriate.

As illustrated in FIG. 15A1, the antenna 914 is provided on one of the opposite sides of the power storage unit 913 with the layer 916 provided therebetween, and as illustrated in FIG. 15A 2, the antenna 915 is provided on the other of the opposite sides of the power storage unit 913 with a layer 917 provided therebetween. The layer 917 has a function of blocking an electromagnetic field from the power storage unit 913, for example. As the layer 917, for example, a magnetic body can be used.

With the above structure, both of the antennas 914 and 915 can be increased in size.

Alternatively, as illustrated in FIGS. 15B1 and 15B2, two opposite sides of the power storage unit 913 in FIGS. 14A and 14B may be provided with different types of antennas. FIG. 15B1 is an external view showing one side of the opposite surfaces, and FIG. 15B2 is an external view showing the other side of the opposite surfaces. For portions similar to those in FIGS. 14A and 14B, a description of the power storage device illustrated in FIGS. 14A and 14B can be referred to as appropriate.

As illustrated in FIG. 15B1, the antennas 914 and 915 are provided on one of the opposite sides of the power storage unit 913 with the layer 916 provided therebetween, and as illustrated in FIG. 15B2, an antenna 918 is provided on the other of the opposite sides of the power storage unit 913 with the layer 917 provided therebetween. The antenna 918 has a function of communicating data with an external device, for example. An antenna with a shape that can be applied to the antennas 914 and 915, for example, can be used as the antenna 918. As a system for communication using the antenna 918 between the power storage device and an external device, a response method that can be used between the power storage device and another device, such as NFC, can be employed.

Figure 16A:
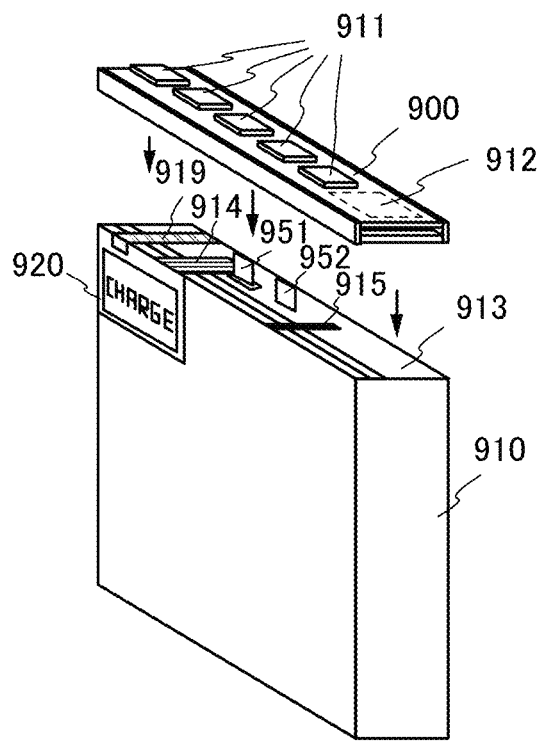
FIGS. 16A and 16B illustrate examples of power storage devices.

Alternatively, as illustrated in FIG. 16A, the power storage unit 913 in FIGS. 14A and 14B may be provided with a display device 920. The display device 920 is electrically connected to the terminal 911 via a terminal 919. It is possible that the label 910 is not provided in a portion where the display device 920 is provided. Note that for the same portions as the power storage device in FIGS. 14A and 14B, description on the power storage device in FIGS. 14A and 14B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 16B:
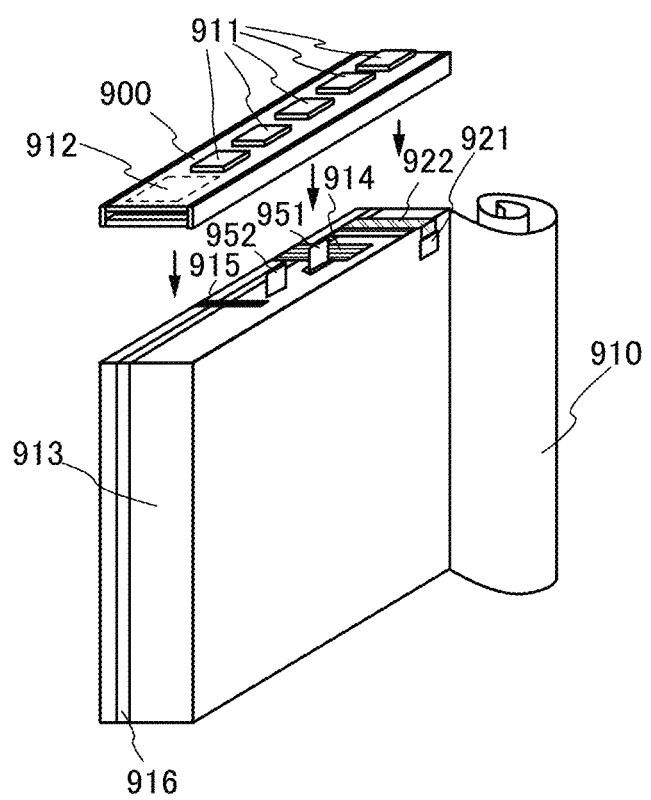

Alternatively, as illustrated in FIG. 16B, the power storage unit 913 in FIGS. 14A and 14B may be provided with a sensor 921. The sensor 921 is electrically connected to the terminal 911 via a terminal 922. Note that for the same portions as the power storage device in FIGS. 14A and 14B, description on the power storage device in FIGS. 14A and 14B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage device is placed can be detected and stored in a memory inside the circuit 912.

FIGS. 17A to 17F illustrate examples of electronic devices including the flexible storage batteries described in FIG. 8, FIGS. 12A to 12C, and FIGS. 13A to 13C. Examples of electronic devices each including the flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, the flexible power storage device can be incorporated along a curved inside/outside wall surface of a house or a building or a curved interior/exterior surface of a car.

Figure 17A:
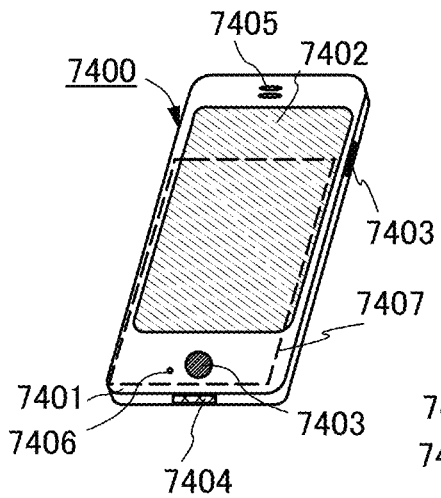
FIGS. 17A to 17F illustrate examples of power storage devices.

FIG. 17A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 17B:
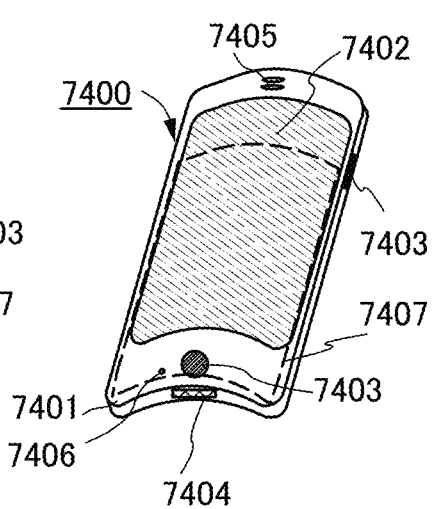
Figure 17C:
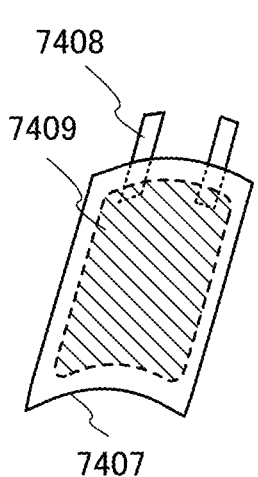

FIG. 17B illustrates the mobile phone 7400 that is bent. When the whole mobile phone 7400 is bent by the external force, the power storage device 7407 included in the mobile phone 7400 is also bent. FIG. 17C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 17D:
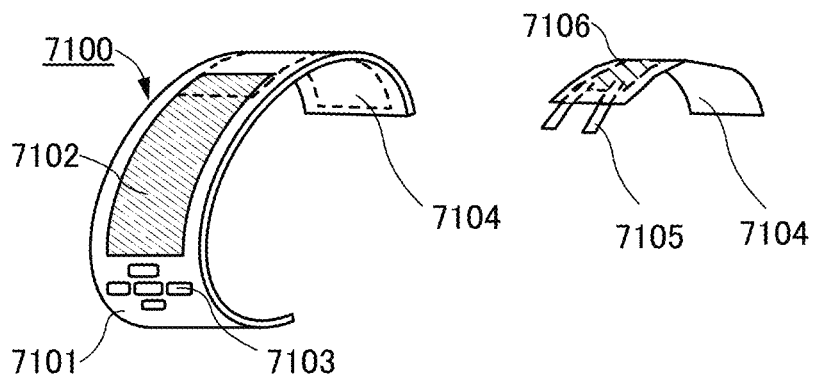
Figure 17E:
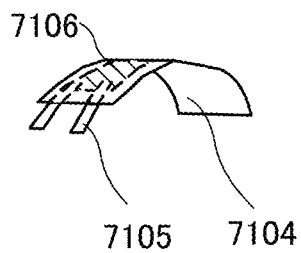

FIG. 17D illustrates an example of a bangle display device. A portable display device 7100 includes a housing 7101, a display portion 7102, an operation button 7103, and a power storage device 7104. FIG. 17E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a main surface of the housing or a main surface of the power storage device 7104 partly or totally changes to have a radius of curvature R of greater than or equal to 40 mm and less than or equal to 150 mm. The radius of curvature R at the main surface of the power storage device 7104 is greater than or equal to 40 mm and less than or equal to 150 mm, the reliability can be kept high. Note that the power storage device 7104 includes a lead electrode 7105 electrically connected to a current collector 7106. The current collector 7106 is, for example, a copper foil, and partly alloyed with gallium; thus, adhesion between the current collector 7106 and an active material layer in contact with the current collector 7106 is improved and the power storage device 7104 can have high reliability even when the power storage device 7104 is bent and its curvature is changed many times.

Figure 17F:
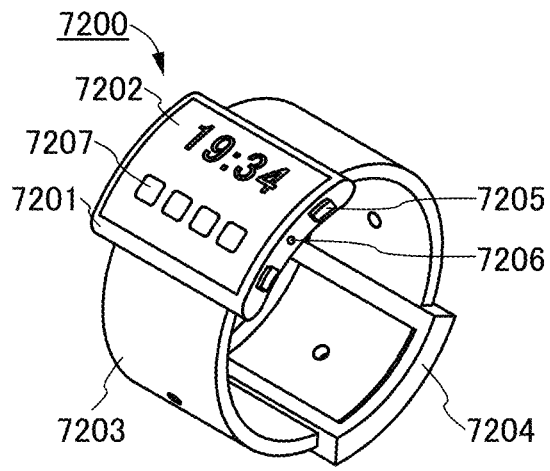

FIG. 17F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 includes the power storage device with an electrode member of one embodiment of the present invention. For example, the power storage device 7104 illustrated in FIG. 17E that is in the state of being curved can be provided in the housing 7201. Alternatively, the power storage device 7104 illustrated in FIG. 17E can be provided in the band 7203 such that it can be curved.

[Examples of Electrical Devices: Vehicles]

Next, examples where a storage battery is used in a vehicle will be described. The use of storage batteries in vehicles enables production of next-generation clean energy vehicles such as hybrid electric vehicles (HEV), electric vehicles (EV), and plug-in hybrid electric vehicles (PHEV).

Figure 18A:
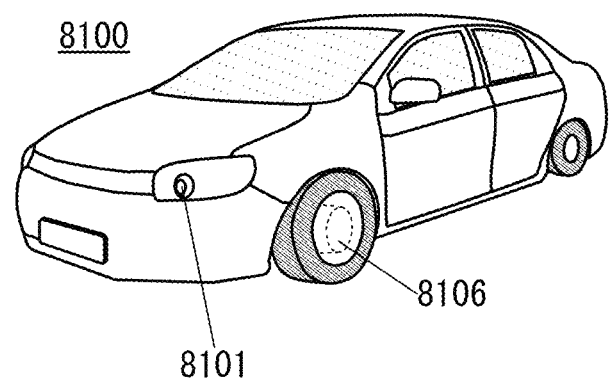
FIGS. 18A and 18B illustrate application examples of a power storage device.
Figure 18B:
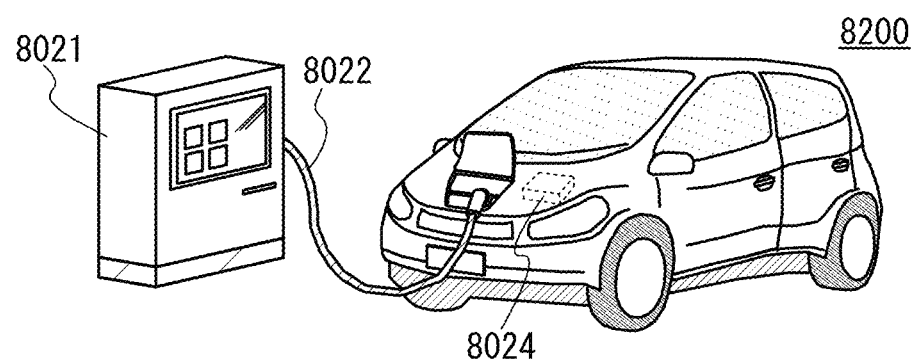

FIGS. 18A and 18B each illustrate an example of a vehicle using one embodiment of the present invention. An automobile 8100 illustrated in FIG. 18A is an electric vehicle which runs on the power of the electric motor. Alternatively, the automobile 8100 is a hybrid electric vehicle capable of driving appropriately using either an electric motor or an engine. One embodiment of the present invention can provide a high-mileage vehicle. The automobile 8100 includes the power storage device. The power storage device is used not only for driving an electric motor 8106, but also for supplying electric power to a light-emitting device such as a headlight 8101 or a room light (not illustrated).

The power storage device can also supply electric power to a display device included in the automobile 8100, such as a speedometer or a tachometer. Furthermore, the power storage device can supply electric power to a semiconductor device included in the automobile 8100, such as a navigation system.

FIG. 18B illustrates the automobile 8100 including the power storage device. The automobile 8100 can be charged when the power storage device is supplied with electric power through external charging equipment by a plug-in system, a contactless power feeding system, or the like. In FIG. 18B, the power storage device included in the automobile 8100 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The ground-based charging apparatus 8021 may be a charging station provided in a commerce facility or a power source in a house. For example, with the use of a plug-in technique, the power storage device included in the automobile 8100 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting the power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be combined with any of the other embodiments as appropriate.

Example 1

In this example, half cells were fabricated using the negative electrode described in Embodiment 1 and the cycle characteristics were measured.

(Fabrication of Composites)

Composite particles were fabricated. First, titanium powder with a particle diameter of 45 μm and silicon powder with a particle diameter of 5 μm were weighed so that the molar ratio between titanium and silicon was 1:2 and the sum of the weights were approximately 20 g. The weighed titanium powder, silicon powder, and media were put to an accessory grinding container (made of chromium, capacitance of 500 ml) of a planetary ball mill (LP-4, manufactured by Ito Seisakusho). The media were chromium steel balls with a diameter of 10 mm and occupied one third of the volume of the grinding container (50 chromium steel balls, approximately 200 g). By setting the inside of the grinding container to an Ar atmosphere and performing planetary centrifugal mixing at a spinning rate of 200 rpm, a composite of Sample A was fabricated. By changing the spinning rate to 250 rpm and further performing planetary centrifugal mixing on part of Sample A, composites of Samples B to D were fabricated. Samples B to D differ in treatment time of stirring at the spinning rate of 250 rpm. In other words, Sample B, Sample C, and Sample D were obtained as a result of stirring for 18 hours, 38 hours, and 50 hours, respectively. Table 1 shows grinding process conditions of Samples A to D as fabricated composites and average particle diameters and values of D90 of Samples B to D and Comparative Sample E (Si particles). The particle diameter was measured using a laser diffraction particle size analyzer (SALD-2200 manufactured by Shimadzu Corporation). A laser diffraction and scattering method was used as a method for calculating the particle size. Note that the average particle diameter and D90 of Sample A were not measured, however, are considered to be larger than those of Sample B.

TABLE 1

|  | Ball mill condition | Average particle diameter (μm) | D90 (μm) |
|---|---|---|---|
| Sample A | 200 rpm, 20 hr. | — | — |
| Sample B | 200 rpm, 20 hr. + 250 rpm, 18 hr. | 4.626 | 36.049 |
| Sample C | 200 rpm, 20 hr. + 250 rpm, 38 hr. | 3.294 | 32.784 |
| Sample D | 200 rpm, 20 hr. + 250 rpm, 50 hr. | 2.970 | 19.437 |
| Comparative Sample E | — | 6.071 | 11.984 |

(Fabrication of Negative Electrodes)

By using Samples A to D and Comparative Sample E, which had been obtained, the negative electrodes were fabricated by the following method. Slurry was fabricated by the following method using composites particle or Si particles, acetylene black, and a polyimide as a binder (more precisely, the precursor of polyimide). A stainless steel foil with a thickness of 10 μm covered with nickel was used as a negative electrode current collector. The composite particles or Si particles, acetylene black, and a polyimide as a binder were mixed at a ratio of 80:5:15 (wt %) in a planetary mixer to form slurry. As the solvent, NMP was used. First, composite particles or Si particles were added to the solvent, and mixing was performed in the mixer. Next, acetylene black and NMP were added and kneading was performed. After that, the precursor of polyimide and NMP were added to the kneaded mixture and mixing was performed in the mixer. Lastly, NMP was added again to the mixture and mixing was performed in the mixer to form slurry. Mixing was performed at 2000 rpm for 5 minutes. The mixing and kneading were performed five times in total. Next, the slurry was applied to a current collector by a blade method. The operating speed of the blade was set to 10 mm/sec. NMP was vaporized by drying in air at 50° C. for 1 hour. Note that for imidization of the precursor of polyimide, heat treatment was performed at 400° C. for 5 hours in an $N_2$ atmosphere.

The negative electrodes fabricated using Samples A to D and Comparative Sample E in the aforementioned manner are referred to as Negative Electrodes A to D and Comparative Negative Electrode E.

Figure 19:
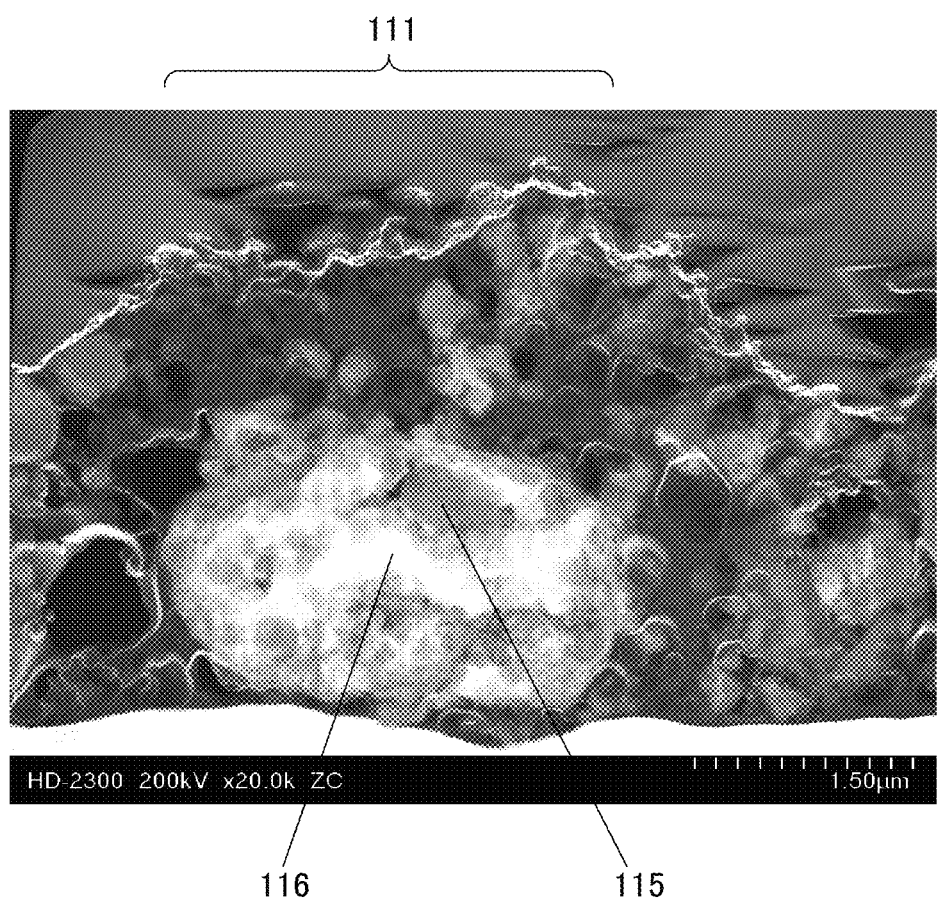
FIG. 19 is a cross-sectional STEM image of Electrode A of Example 1.
Figure 20A:
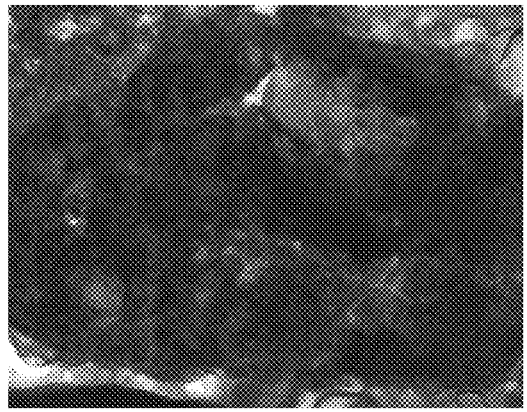
FIGS. 20A to 20C show STEM-EDX analysis results of Electrode A of Example 1.
Figure 20B:
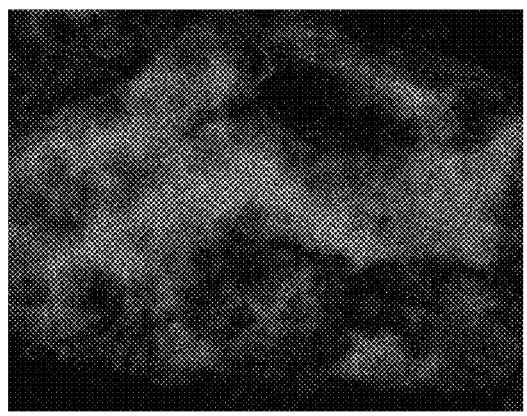
Figure 20C:
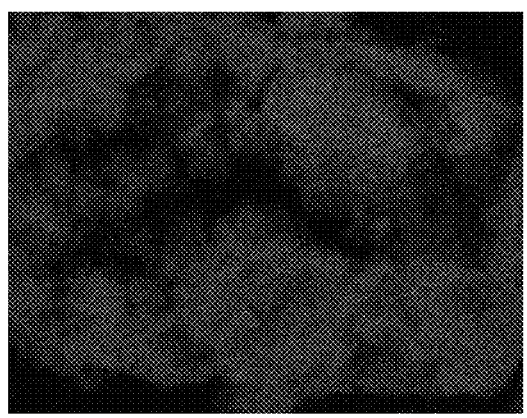

FIG. 19 shows a cross section of Electrode A fabricated using Sample A that was observed by a scanning transmission electron microscope (STEM). FIG. 19 shows Electrode A including the composite 111. FIGS. 20A to 20C show results of elementary analysis of Electrode A, which was fabricated using Sample A, obtained by STEM energy dispersive X-ray spectroscopy (STEM-EDX). FIG. 20A is a STEM image of the composite 111 shown in FIG. 19. FIG. 20B is a mapping image of titanium. FIG. 20C is a mapping image of silicon. As shown in FIG. 19 and FIGS. 20A to 20C, the composite 111 includes a negative electrode active material 115 including silicon and a functional material 116 including titanium. In addition, the negative electrode active material 115 and the functional material 116 are in contact with each other.

Figure 21:
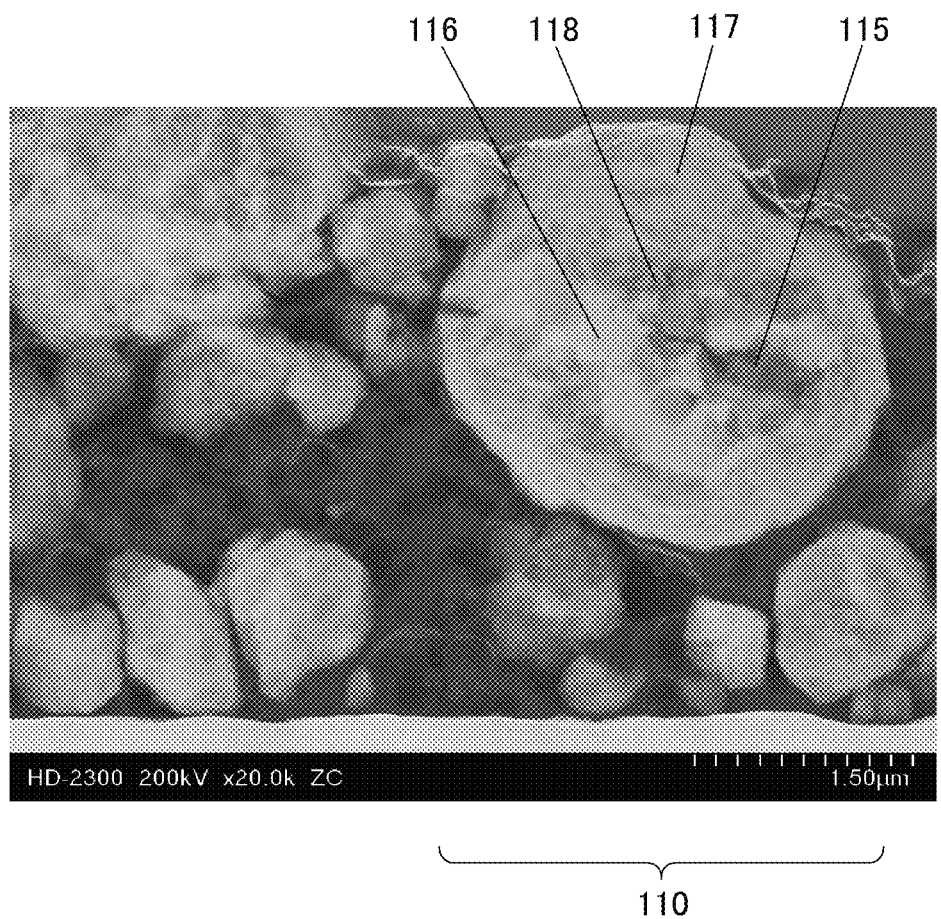
FIG. 21 is a cross-sectional STEM image of Electrode B of Example 1.

FIG. 21 shows a cross section of Electrode B fabricated using Sample B that was observed by STEM. The composite 110 in FIG. 21 includes the negative electrode active material 115 including silicon, the functional material 116 including titanium, the compound 117 including titanium silicide, and the compound 118. In addition, the negative electrode active material 115 is in contact with at least one of the functional material 116, the compound 117, and the compound 118. The compound 118 has a larger weight proportion of silicon to titanium than that in compound 117. Note that the weight ratio of silicon and titanium of each of the compounds 117 and 118 is not constant in the composite 111.

(Fabrication of Cells)

Next, half cells were fabricated using Negative Electrodes A to D (hereinafter, collectively referred to as a composite electrode) and Comparative Negative Electrode E (hereinafter, referred to as a silicon electrode) fabricated in the aforementioned manner. For measurement of the properties, a CR2032 coin-type storage battery (with a diameter of 20 mm and a height of 3.2 mm) was used. Metallic lithium was used for a counter electrode, and polypropylene was used for a separator. Furthermore, 1 mol/l of $LiPF_6$ was used as a solute and EC (ethylene carbonate) and DEC (diethyl carbonate) mixed at a volume ratio of 3:7 were used as a solvent for the electric solution. Note that the half cells fabricated using the Negative Electrodes A to D were referred to as Cells A to D, respectively. The half cell fabricated using the Comparative Electrode E was referred to as Cell E.

Figure 22:
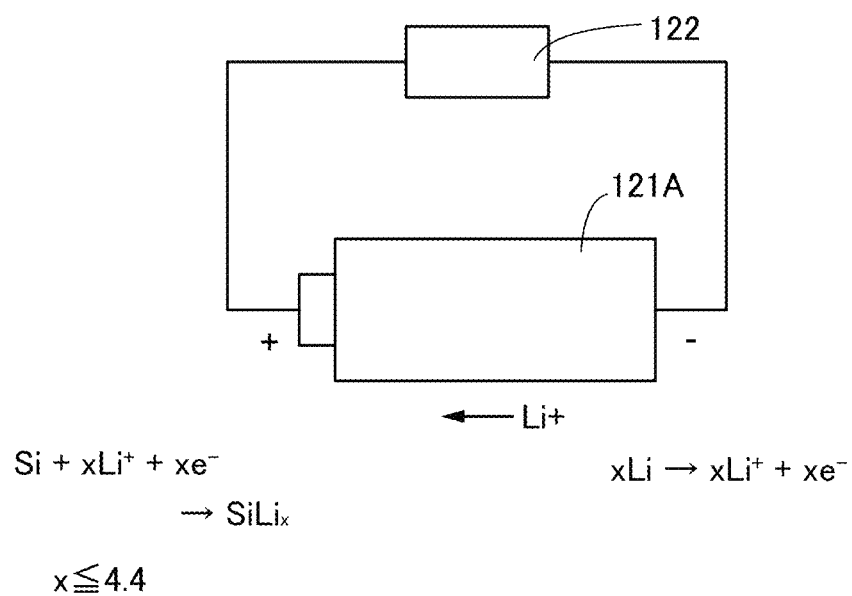
FIG. 22 shows a connection structure of a half cell according to Example 1.

Charge and discharge of the half cell using the composite electrode or the silicon electrode will be described using formulas. FIG. 22 shows a connection structure of a half cell 121A and a load 122 when the half cell including the composite electrode or the silicon electrode and the Li counter electrode is discharged. When the half cell 121A is discharged, a reaction of Formula (1) occurs at the composite electrode or the silicon electrode.

$$Si + xLi^+ + xe^- \rightarrow SiLi \quad (1)$$

A reaction of Formula (2) occurs at the Li electrode.

$$xLi \rightarrow xLi^+ + xe^- \quad (2)$$

Figure 23:
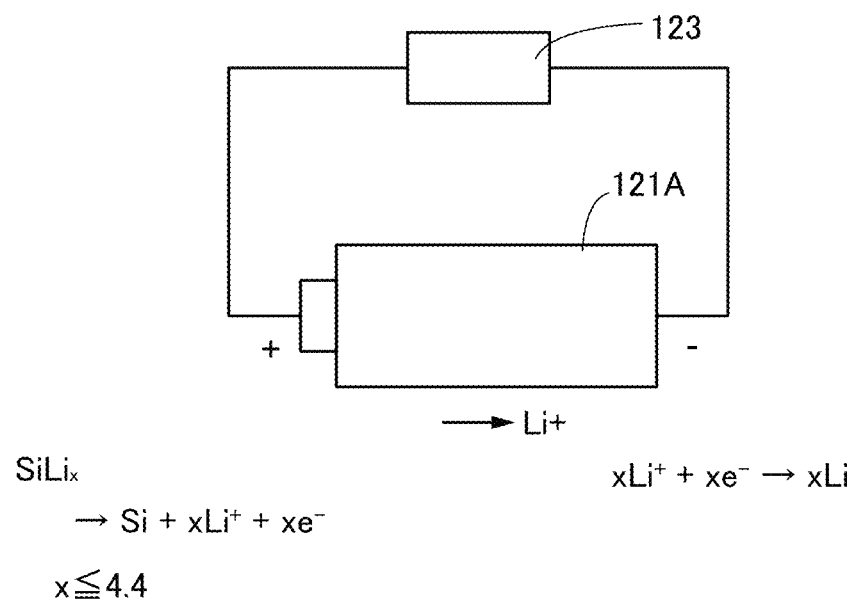
FIG. 23 shows a connection structure of a half cell according to Example 1.

FIG. 23 shows a connection structure of the half cell 121A and a charger 123 when the half cell including the composite electrode or the silicon electrode and the Li counter electrode is charged. When the half cell 121A is charged, a reaction of Formula (3) occurs at the composite electrode or the silicon electrode.

$$SiLi_x \rightarrow Si + xLi^+ + xe^- \quad (3)$$

A reaction of Formula (4) occurs at the Li electrode.

$$xLi^+ + xe^- \rightarrow xLi \quad (4)$$

Here, in Formulas (1) to (4), x satisfies the relation x≤4.4.

As indicated by Formulas (1) to (4), Li is intercalated into the silicon in discharging and is deintercalated from the silicon in charging.

Figure 24:
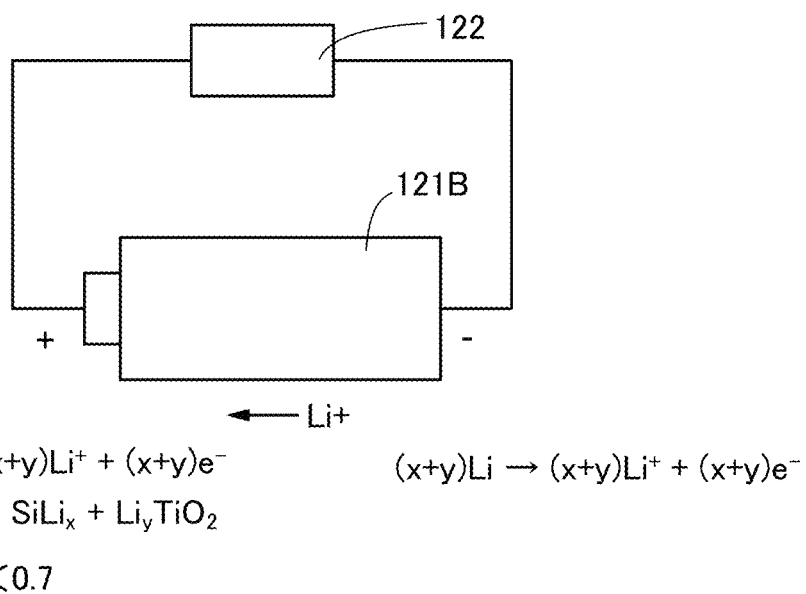
FIG. 24 shows a connection structure of a half cell according to Example 1.

Note that in the composite electrode, when a part of titanium contained in the composite particles is oxidized, titanium oxide may contribute to charging and discharging. A reaction may occur as follows. FIG. 24 shows a connection structure of a half cell 121B and a load 122 when the half cell using the composite electrode that includes titanium oxide and the Li counter electrode is discharged. When the half cell 121B is discharged, a reaction of Formula (5) occurs at the composite electrode.

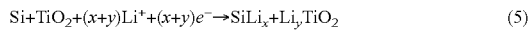

$$Si+TiO_2+(x+y)Li^++(x+y)e^- \rightarrow SiLi_x+Li_yTiO_2 \quad (5)$$

A reaction of Formula (6) occurs at the Li electrode.

$$(x+y)Li \rightarrow (x+y)Li^++(x+y)e^- \quad (6)$$

Figure 25:
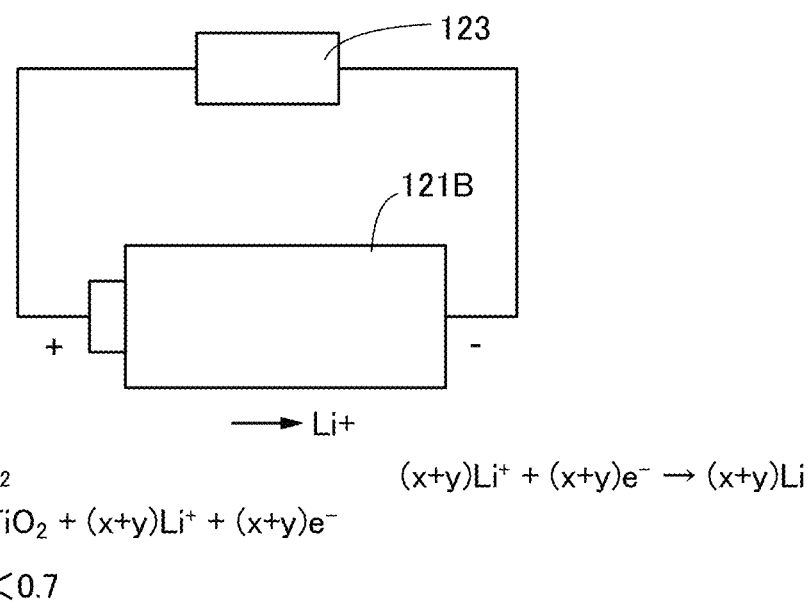
FIG. 25 shows a connection structure of a half cell according to Example 1.

FIG. 25 shows a connection structure of the half cell 121B and the charger 123 when the half cell including the composite electrode that includes titanium oxide and the Li counter electrode is charged. When the half cell 121B is charged, a reaction of Formula (7) occurs at the composite electrode.

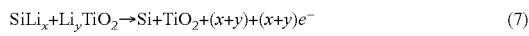

$$SiLi_x+Li_yTiO_2 \rightarrow Si+TiO_2+(x+y)+(x+y)e^- \quad (7)$$

A reaction of Formula (8) occurs at the Li electrode.

$$(x+y)Li^++(x+y)e^- \rightarrow (x+y)Li \quad (8)$$

Here, in Formulas (5) to (8), x satisfies the relation x≤4.4 and y satisfies the relation y≤0.7.

As indicated by Formulas (5) to (8), Li is intercalated into the silicon and titanium oxide in discharging and is deintercalated from the silicon and titanium oxide in charging.

(Measurement of Cells)

Next, the measurement results of charge and discharge characteristics and cycle characteristics of Cells A to E fabricated in the above-described manner are shown.

The measurement conditions of the half cells will be described. Constant current-constant voltage charging was performed at a rate of 0.2 C and the constant current discharging was performed at a rate of 0.2 C, as the charging and discharging method. In charging and discharging, the upper voltage limit was 1.5 V and the lower voltage limit was 0.01 V. The measurement temperature was 25° C. Note that the rate was calculated using the theoretical capacity of silicon of 4200 mAh/g as a reference.

Figure 26:
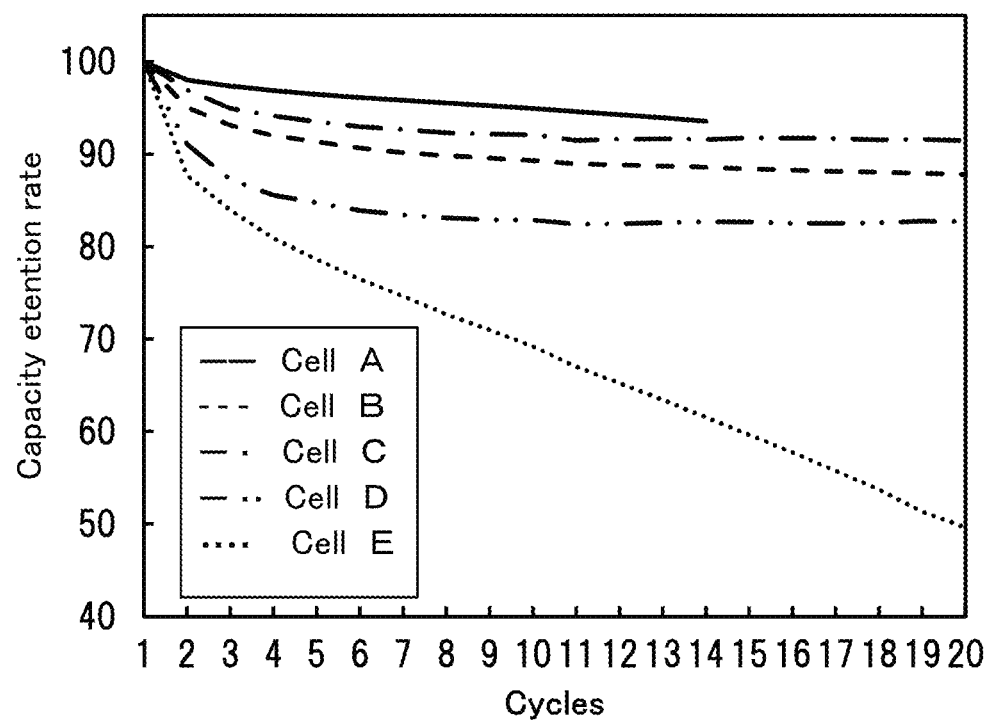
FIG. 26 is a graph showing change in capacity retention rates of the half cells according to Example 1.

Table 2 shows the initial discharge capacity obtained as a result of charge and discharge of Cells A to E, the capacity retention rates after the 10 cycles with respect to the initial discharge capacity, and the capacity retention rates after the 20 cycles with respect to the initial discharge capacity. FIG. 26 shows changes in capacity retention rates when the initial discharge capacity is 100%. The results of Cell A, Cell B, Cell C, Cell D, and Cell E are represented by a solid line, a broken like, a dashed-dotted line, a dashed double-dotted line, and a dotted line, respectively. Note that the capacity retention rate after 20 cycles of Cell A is under measurement and therefore is not shown.

TABLE 2

|  | Initial capacity (mAh/g) | 10 cy capacity retention rate (%) | 20 cy capacity retention rate (%) |
| --- | --- | --- | --- |
| Cell A | 1818.1 | 94.9 | — |
| Cell B | 746.6 | 89.3 | 87.8 |
| Cell C | 304.2 | 92.1 | 91.5 |
| Cell D | 179.3 | 89.3 | 82.7 |
| Cell E | 3259.5 | 69.2 | 49.6 |

Table 2 and FIG. 26 show Cells A to D using composite particles as negative electrode active materials used in a negative electrode for a power storage device of one embodiment of the present invention. Cells A to D have higher capacity retention rates than Cell E using silicon particles as a negative electrode active material. This is because stress caused by expansion and contraction of silicon due to charge and discharge can be relieved because titanium is in contact with silicon in the composite particle, which can avoid crack and separation of silicon.

Furthermore, with a longer time of stirring in the fabrication of composite particles, the initial capacity tends to decrease. This is because in accordance with the treatment time of stirring, the amount of titanium silicide formed in the composite particle increases and silicon contributing mainly to occlusion and release of lithium ions decreases. On the other hand, the treatment time of stirring and the capacity retention rate of the cell do not show a simple proportional relationship. Accordingly, in order to make a power storage device with high capacity and excellent cycle characteristics, the treatment time of stirring is preferably determined appropriately.

Example 2

In this example, power storage devices were fabricated to evaluate the performance of the negative electrode for a power storage device of one embodiment of the present invention. Evaluation results of the characteristics of the negative electrode for a power storage device will be described.

The power storage devices fabricated in this example are four coin-type power storage devices (coin cells), i.e., Samples F to H and Comparative Sample I. Each sample includes an electrode, a counter electrode, an electrolytic solution, and a separator. All the samples have the same structures except for the electrode. A fabrication method of the electrode will be described below. Note that the electrodes used for Sample F, Sample G, Sample H, and Comparative Sample I are Electrode F, Electrode G, Electrode H, and Electrode I, respectively.

(Fabrication Method of Electrode)

An active material layer and a functional layer were formed over a titanium film, which was the current collector, by the sputtering apparatus. The same silicon target was used to form the active material layers of Electrodes F to I and the same titanium target was used to form the functional layers of Electrodes F to H.

A 90-nm-thick silicon film and a 30-nm-thick titanium nitride (TiN$_x$) film were formed over the titanium substrate as for Electrode F. The deposition conditions were as follows: the Ar gas flow rate was 9 sccm, and the N$_2$ gas flow rate was 1 sccm.

A 90-nm-thick silicon film and a 30-nm-thick titanium oxide (TiO$_x$) film were formed over the titanium substrate as for Electrode G. The deposition conditions were as follows: the Ar gas flow rate was 9 sccm, and the O$_2$ gas flow rate was 1 sccm.

A 90-nm-thick silicon film and a 30-nm-thick titanium film were formed over the titanium substrate as for Electrode H. Deposition condition of titanium layer was set to Ar gas flow rate as 9 sccm.

A 90-nm-thick silicon film was formed over the titanium substrate as for Electrode I.

The percentage of nitrogen content in the titanium nitride film of Electrode F was approximately 18 at. %. The percentage of oxygen content in the titanium nitride film of Electrode F was approximately higher than or equal to 0.1 at. % and lower than or equal to 0.3 at. %. Furthermore, the percentage of oxygen content in the titanium oxide film of Electrode G was approximately 40 at. %. The percentage of oxygen content in the titanium oxide layer of Electrode G was approximately higher than or equal to 0.3 at. % and lower than or equal to 0.5 at. %. Note that secondary ion mass spectrometry (SIMS) was used for quantitative analysis of the titanium nitride films and the titanium oxide films.

(Fabrication of Samples)

A 600-µm-thick lithium foil was used as the counter electrode in each of Samples F to H and Comparative Sample I. Furthermore, EC (ethylene carbonate) and DEC (diethyl carbonate) mixed at a volume ratio of 3:7 was used as a solvent and $LiPF_6$ was used as a solute for the electric solution. Here, a 25-µm-thick polypropylene was used as a separator.

Through the above steps, the samples were fabricated.

(Measurement of Samples)

Next, the initial charge and discharge cycle characteristics at 25° C. of the samples in this example were measured. The measurement was performed with a charge-discharge measuring instrument (produced by TOYO SYSTEM Co., LTD.). Constant current charging was performed with the upper limit of 1.5 V and constant current-constant voltage discharging was performed with the lower limit of 0.01 V. Discharging rate was 0.2 C and the rate was calculated using the theoretical capacity of silicon of 4200 mAh/g as a reference.

Figure 27A:
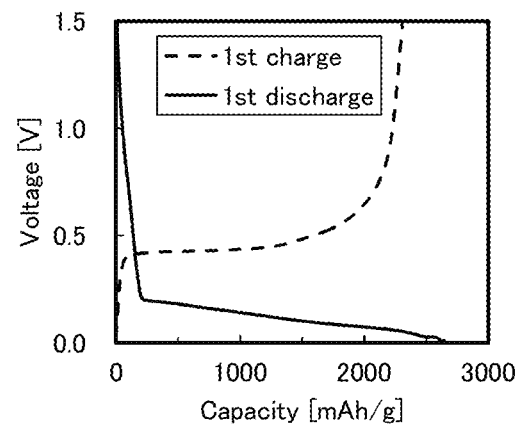
FIGS. 27A to 27D show initial charge and discharge characteristics of samples according to Example 2.
Figure 27B:
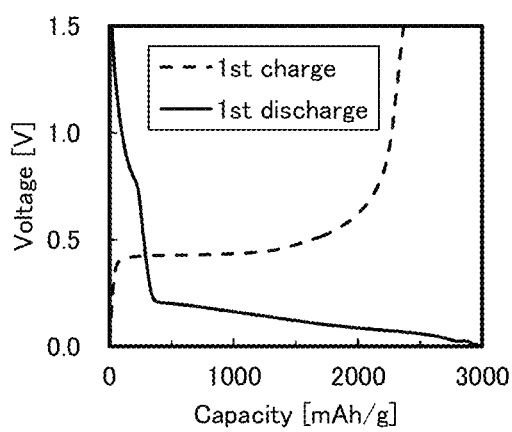
Figure 27C:
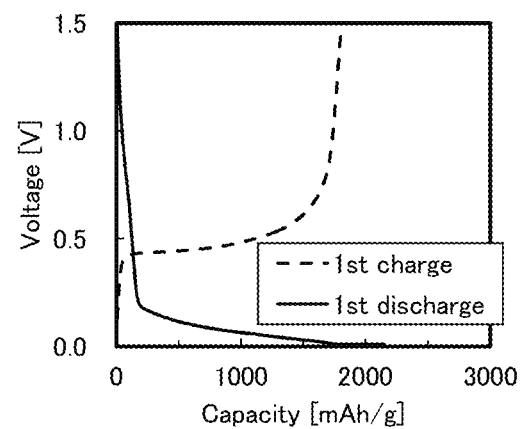
Figure 27D:
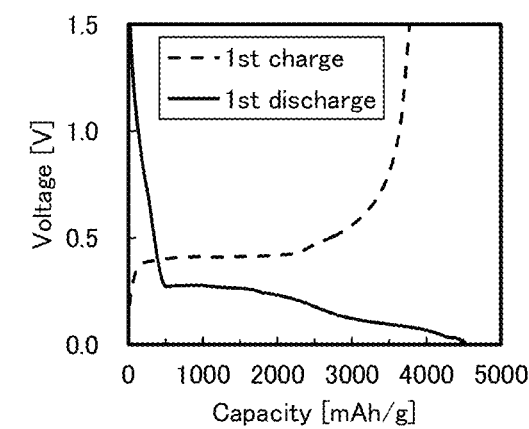
Figure 28A:
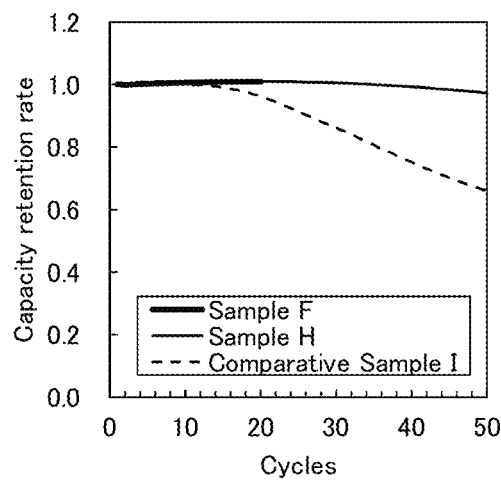
FIG. 28A to 28D are graphs showing change in capacity retention rates of the samples according to Example 2.
Figure 28B:
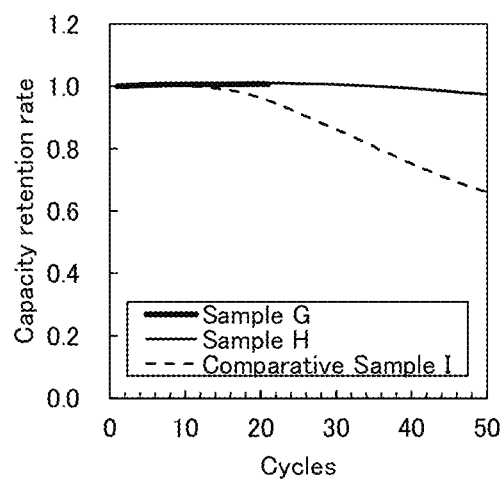
Figure 28C:
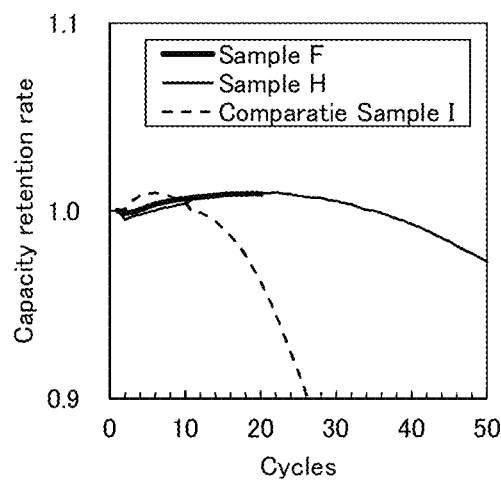
Figure 28D:
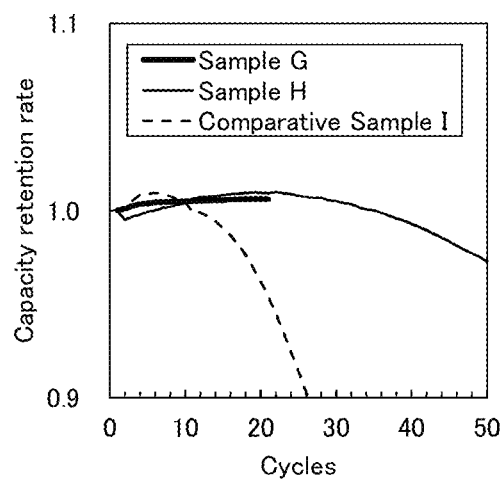

FIG. 27A shows charge and discharge curves of Sample F, FIG. 27B shows charge and discharge curves of Sample G, FIG. 27C shows charge and discharge curves of Sample H, and FIG. 27D shows charge and discharge curves of Comparative Sample I. In FIGS. 27A to 27D, a horizontal axis represents capacity (mAh/g), and a vertical axis represents voltage (V). FIGS. 27A to 27C and FIG. 27D have different scales of the horizontal axis.

The obtained initial discharge capacities of Sample F, G, and H, and Comparative Sample I were 2645 mAh/g, 2955 mAh/g, 2158 mAh/g, and 4518 mAh/g, respectively. Furthermore, the initial charge and discharge efficiency of Sample F was 84.8% and the initial charge and discharge efficiency of Sample G was 79.9%.

Next, the cycle characteristics at 25° C. of the samples in this example were measured. Charge and discharge conditions of the cycle characteristics are the same as those of the above-described measurement of the initial charge and discharge characteristics.

FIG. 28 shows changes in capacity retention rates when the initial discharge capacity is 1. FIG. 28A is a graph showing the capacity retention rates of Samples F, H and Comparative Sample I. FIG. 28B is a graph showing the capacity retention rates of Samples G and H and Comparative Sample I. FIGS. 28C and 28D are graphs in which the vertical axes in FIGS. 28A and 28B are enlarged, respectively. In FIGS. 28A to 28D, Sample F and Sample G are each represented by a thick solid line, Sample H is represented by a thin solid line, and Comparative Sample I is represented by a thin dashed line. Note that the capacity retention rates of Samples F and G show up to the 20th cycle and the capacity retention rates of Sample H and Comparative Sample I show up to the 50th cycle.

From FIGS. 28A to 28D, Samples F and G show favorable cycle characteristics similar to that of Sample H. Thus, titanium nitride and titanium oxide can be used favorably as the functional material in the composite particle included in the negative electrode for power storage device in a manner similar to that of titanium.

Example 3

In this example, power storage devices different from those of Example 2 were fabricated to evaluate the performance of the negative electrode for a power storage device of one embodiment of the present invention. Evaluation results of the characteristics of the negative electrode for a power storage device will be described.

The power storage devices fabricated in this example are two coin-type power storage devices (coin cell), i.e., Sample J and Comparative Sample K. Each sample includes an electrode, a counter electrode, an electrolytic solution, and a separator. All the samples have the same structures except for the electrode. A fabrication method of the electrode will be described below. Note that the electrodes used for Sample J and Comparative Sample K are Electrode J and Electrode K, respectively.

(Fabrication Method of Electrode)

An active material layer and a functional layer were formed over a titanium film, which was the current collector, by the sputtering apparatus. The same silicon target was used to form the active material layers of Electrodes J and K.

A 70-nm-thick silicon film and a 30-nm-thick titanium film were formed over the titanium substrate as for Electrode J. The deposition condition was as follows: the Ar gas flow rate was 9 sccm.

A 70-nm-thick silicon film was formed over the titanium substrate as for Electrode K.

(Fabrication of Samples)

Half cells were fabricated using Electrodes J and K. For measurement of the characteristics, a CR2032 coin-type storage battery (with a diameter of 20 mm and a height of 3.2 mm) was used. Metallic lithium was used for the counter electrode, and polypropylene was used for the separator. EC (ethylene carbonate) and DEC (diethyl carbonate) mixed at a volume ratio of 3:7 was used as a solvent and $LiPF_6$ was used as a solute for the electric solution. The electrolytic solution was prepared by dissolving $LiPF_6$ in the organic solvent at a concentration of 1.0 mol/L.

Through the above steps, the samples were fabricated.

(Measurement of Samples)

Next, the cycle characteristics at 25° C. of the samples in this example were measured. The measurement was performed with a charge-discharge measuring instrument (produced by TOYO SYSTEM Co., LTD.). Constant current-constant voltage charging was performed with the upper limit of 1.5 V and constant voltage discharging was performed with the lower limit of 0.01 V. Discharging rate was 0.2 C and the rate was calculated using the theoretical capacity of active materials including silicon and titanium of 4190 mAh/g as a reference. Note that a break period of 30 minutes or 2 hours was set between a given cycle of charge and discharge and the next cycle of charge and discharge.

Figure 29:
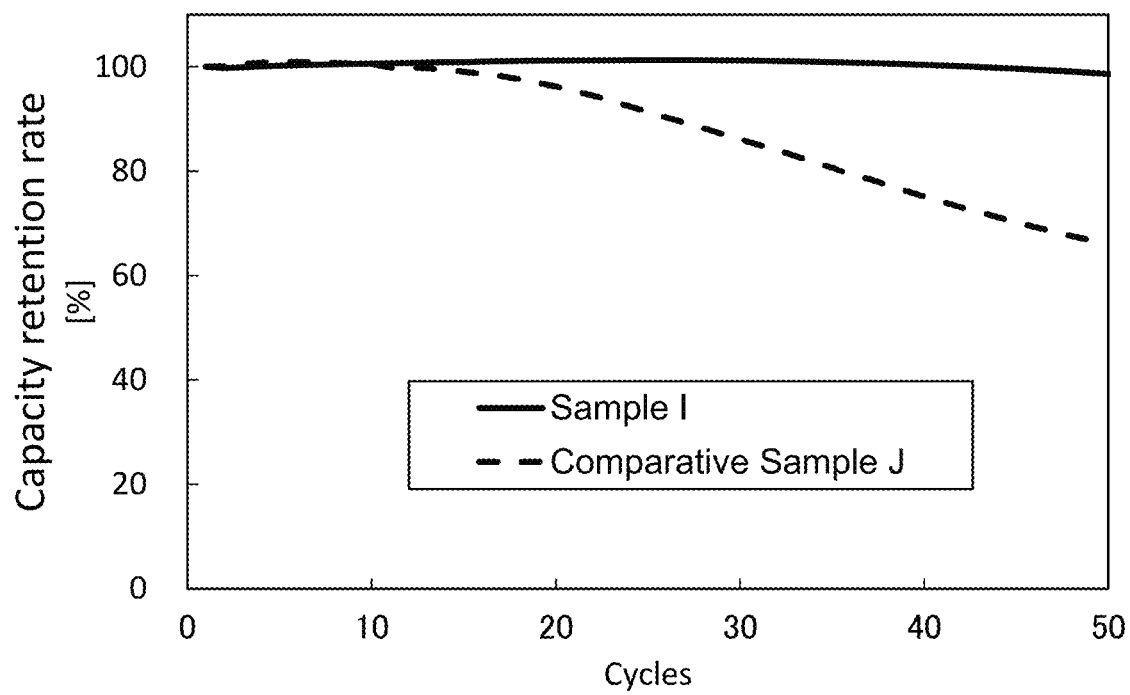
FIG. 29 is a graph showing change in capacity retention rates of the samples according to Example 3.

FIG. 29 shows change in the capacity of the samples in the cycle measurement. In FIG. 29, the capacitance change of Sample J is represented by a solid line and the capacitance change of Comparative Sample K is represented by a broken line. Note that the initial discharge capacity of Sample I and Comparative Sample K were 2122 mAh/g and 3814 mAh/g, respectively.

As shown in FIG. 29, the cycle characteristics of Sample J are more favorable than those of Comparative Sample K.

(Cross-Sectional Observation)

Figure 30A:
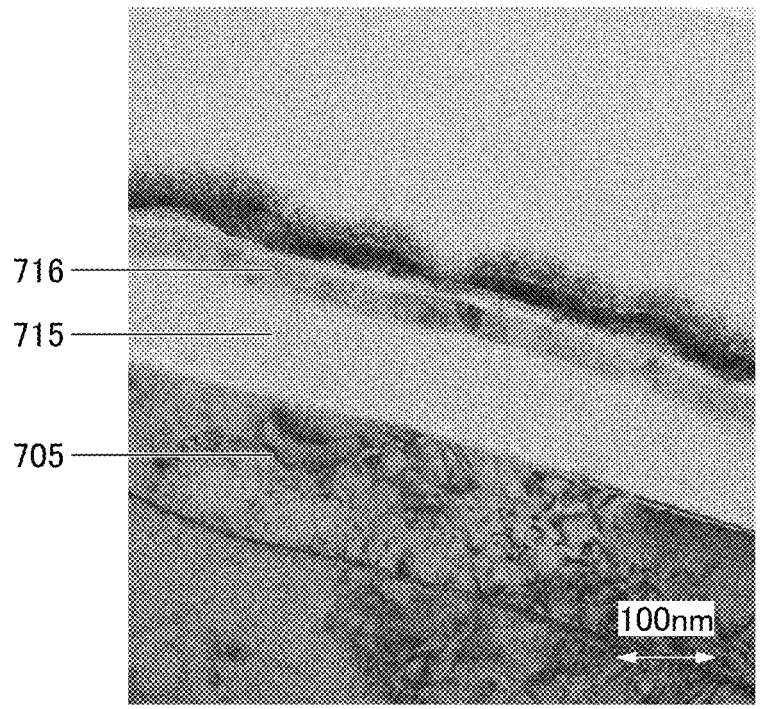
FIGS. 30A and 30B are cross-sectional images of the samples after charging and discharging.
Figure 30B:
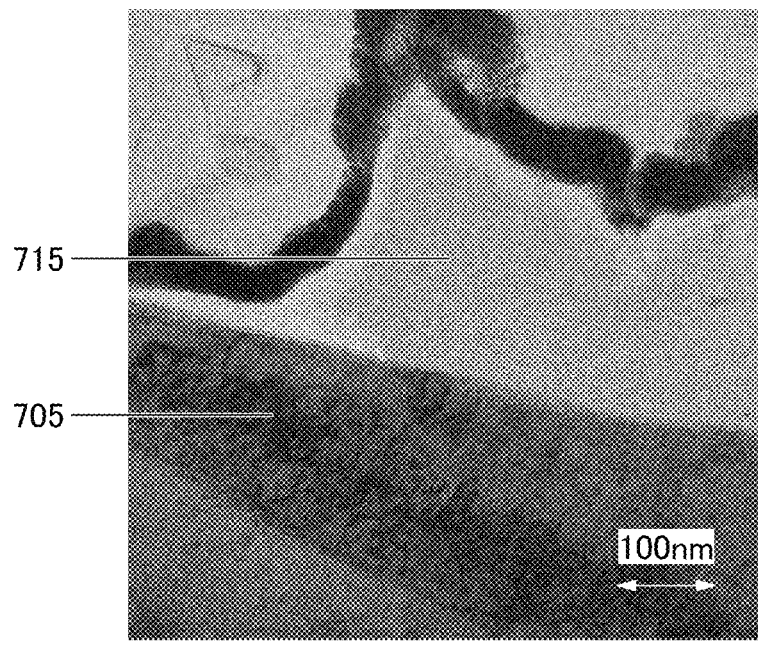

FIGS. 30A and 30B show results of cross-sections examined after charging and discharging of Sample J and Comparative Sample K by STEM. FIG. 30A is a cross-sectional image of a sample fabricated after the 10th cycle of charging and discharging was performed. The sample was fabricated under conditions similar to those of Sample J. FIG. 30B is a cross-sectional image of a sample fabricated after the 10th cycle of charging and discharging was performed. The sample was fabricated under conditions similar to those of Comparative Sample K.

A bump and a cave are caused on a silicon film 715 over a titanium substrate 705 and unevenness on the film surface is increased in the Comparative Sample K. Furthermore, a significant unevenness cannot be observed on the silicon film 715 (see FIG. 30A) even after charging and discharging was performed in Sample J, in which the silicon film 715 is provided on the titanium substrate 705 and the silicon film 715 is covered with a titanium film 716. Accordingly, titanium was confirmed to be a favorable functional material for suppressing deformation that occurs by the expansion and contraction of silicon.

This application is based on Japanese Patent Application serial no. 2015-242739 filed with Japan Patent Office on Dec. 11, 2015 and Japanese Patent Application serial no. 2016-095789 filed with Japan Patent Office on May 12, 2016, the entire contents of which are hereby incorporated by reference.

What is claimed is:

1. A negative electrode for a power storage device comprising:
    a negative electrode active material layer comprising a particle over a current collector, the particle comprising:
    a first region comprising silicon and lithium;
    a second region comprising titanium and one of oxygen and nitrogen;
    a third region comprising titanium and silicon; and
    a fourth region comprising titanium and silicon;
    wherein the third region covers the first region, the second region, and the fourth region,
    wherein the fourth region has a larger concentration of silicon than the third region,
    wherein the first region is in contact with at least part of the second region,
    wherein in an interfacial region between the first region and the second region a weight percentage of the silicon continuously changes, and
    wherein the second region is in contact with at least part of the fourth region.

2. The negative electrode for a power storage device, according to claim 1, wherein a material of the second region has a higher Young's modulus than a material of the first region.

3. The negative electrode for a power storage device, according to claim 1, wherein an atomic ratio of silicon to titanium is two to eight in the particle.

4. The negative electrode for a power storage device, according to claim 1, wherein a surface of the particle is covered by the third region.

5. A power storage device comprising the negative electrode for a power storage device according to claim 1.

6. An electrical device comprising the power storage device according to claim 5.

7. The negative electrode for a power storage device, according to claim 1, wherein an area where the first region is in contact with at least part of the second region is larger than an area where the second region is in contact with at least part of the fourth region.

8. A negative electrode for a power storage device comprising:
    a negative electrode active material layer comprising a particle over a current collector, the particle comprising:
    a first region comprising silicon and lithium;
    a second region comprising titanium and one of oxygen and nitrogen;
    a third region comprising titanium and silicon; and
    a fourth region comprising titanium and silicon;
    wherein the third region covers the first region, the second region, and the fourth region,
    wherein the fourth region has a larger concentration of silicon than the third region,
    wherein the third region is in direct contact with each of the first region, the second region, and the fourth region,
    wherein the first region is in contact with at least part of the second region,
    wherein in an interfacial region between the first region and the second region a weight percentage of the silicon continuously changes, and
    wherein the second region is in contact with at least part of the fourth region.

9. The negative electrode for a power storage device, according to claim 8, wherein a material of the second region has a higher Young's modulus a material of the first region.

10. The negative electrode for a power storage device, according to claim 8, wherein an atomic ratio of silicon to titanium is two to eight in the particle.

11. The negative electrode for a power storage device, according to claim 8, wherein a surface of the particle is covered by the third region.

12. A power storage device comprising the negative electrode for a power storage device according to claim 8.

13. An electrical device comprising the power storage device according to claim 12.

14. The negative electrode for a power storage device, according to claim 8, wherein an area where the first region is in contact with at least part of the second region is larger than an area where the second region is in contact with at least part of the fourth region.

* * * * *